US008887044B1

(12) United States Patent
Goodspeed et al.

(10) Patent No.: US 8,887,044 B1
(45) Date of Patent: Nov. 11, 2014

(54) VISUALLY DISTINGUISHING PORTIONS OF CONTENT

(75) Inventors: Joshua M. Goodspeed, London (GB); Eugene Kalenkovich, Sammamish, WA (US); Tom Killalea, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 114 days.

(21) Appl. No.: 13/535,002

(22) Filed: Jun. 27, 2012

(51) Int. Cl.
*G06F 3/00* (2006.01)
*G06F 3/048* (2013.01)
*G06F 17/00* (2006.01)
*G06F 3/0483* (2013.01)
*G06F 17/21* (2006.01)

(52) U.S. Cl.
CPC ............ *G06F 3/0483* (2013.01); *G06F 17/212* (2013.01)
USPC ........... 715/703; 715/776; 715/202; 715/730; 715/704

(58) Field of Classification Search
CPC .............................. G06F 3/0483; G06F 17/212
USPC .......................... 715/703, 776, 202, 730, 704
See application file for complete search history.

(56) References Cited

U.S. PATENT DOCUMENTS

| | | | |
|---|---|---|---|
| 5,842,167 A | 11/1998 | Miyatake et al. | |
| 5,970,455 A | 10/1999 | Wilcox et al. | |
| 5,995,935 A | 11/1999 | Hagiwara et al. | |
| 6,006,188 A | 12/1999 | Bogdashevsky et al. | |
| 6,513,011 B1 | 1/2003 | Uwakubo | |
| 6,557,026 B1 | 4/2003 | Stephens, Jr. | |
| 7,228,273 B2 | 6/2007 | Okunoki | |
| 7,454,346 B1 | 11/2008 | Dodrill et al. | |
| 7,523,036 B2 | 4/2009 | Akabane et al. | |
| 7,668,718 B2 | 2/2010 | Kahn et al. | |

(Continued)

OTHER PUBLICATIONS

Folsom, "Turning a Novel Into a Screenplay" WritersDigest.com, retrieved on Jan. 31, 2013, at http:www.writersdigest.com/writing-articles/by-writing-genre/script-writing/turning-a-no, 2008, 3 pages.

(Continued)

*Primary Examiner* — David Phantana Angkool
(74) *Attorney, Agent, or Firm* — Lee & Hayes, PLLC

(57) ABSTRACT

In some implementations, a user may select a category, attribute or term related to content item. During presentation of the content item, an electronic device may visually distinguish (or, alternatively, hide) at least one portion of content associated with the selected category, attribute or term. In some examples, a user interface may be displayed to enable the user to select one or more categories, attributes, or terms related to the content item. The user interface may further enable the user to select a graphics scheme to be used for visually distinguishing at least one portion of content corresponding to the selection. Selection information identifying a portion of content to be visually distinguished or hidden may be sent to a content provider, such as for synchronization with other instances of the content item on other devices of a user, or for aggregation of the selection information by the content provider.

35 Claims, 18 Drawing Sheets

(56) References Cited

U.S. PATENT DOCUMENTS

| | | | |
|---|---|---|---|
| 7,739,601 B1* | 6/2010 | Wong et al. | 715/731 |
| 7,764,277 B2* | 7/2010 | Klassen et al. | 345/204 |
| 7,944,860 B2 | 5/2011 | Rajagopalan et al. | |
| 7,957,976 B2 | 6/2011 | Cross, Jr. et al. | |
| 7,966,187 B1 | 6/2011 | Pettay et al. | |
| 7,996,436 B2* | 8/2011 | Schneider et al. | 707/802 |
| 8,024,672 B1* | 9/2011 | Skwarecki et al. | 715/854 |
| 8,065,603 B2* | 11/2011 | Gossweiler et al. | 715/227 |
| 8,117,553 B2* | 2/2012 | Danninger et al. | 715/764 |
| 8,150,695 B1 | 4/2012 | Killalea et al. | |
| 8,225,208 B2* | 7/2012 | Sprang et al. | 715/730 |
| 8,261,177 B2* | 9/2012 | Krishnaswamy et al. | 715/202 |
| 8,326,623 B2 | 12/2012 | Fujii | |
| 8,346,557 B2 | 1/2013 | Kurzweil et al. | |
| 8,499,243 B2* | 7/2013 | Yuki | 715/735 |
| 8,510,657 B2* | 8/2013 | Gilbert et al. | 715/731 |
| 8,533,623 B2* | 9/2013 | St. Jacques, Jr. | 715/776 |
| 8,539,379 B2* | 9/2013 | Skwarecki et al. | 715/854 |
| 8,559,732 B2* | 10/2013 | Rayner | 382/224 |
| 8,560,971 B2* | 10/2013 | Duquene et al. | 715/853 |
| 8,751,939 B2* | 6/2014 | Law et al. | 715/744 |
| 2006/0161437 A1 | 7/2006 | Akabane et al. | |
| 2007/0118378 A1 | 5/2007 | Skuratovsky | |
| 2007/0146360 A1 | 6/2007 | Clatworthy et al. | |
| 2010/0324902 A1 | 12/2010 | Kurzweil et al. | |
| 2012/0304101 A1* | 11/2012 | Dicke | 715/776 |
| 2013/0031503 A1* | 1/2013 | Madhavan et al. | 715/776 |

OTHER PUBLICATIONS

Office action for U.S. Appl. No. 13/438,541, mailed on Feb. 11, 2013, Killalea et al., "Presentation of Written Works Based on Character Identities and Attributes", 31 pages.

Office action for U.S. Appl. No. 13/438,541, mailed on Jul. 3, 2013, Killalea et al., "Presentation of Written Works Based on Character Identities and Attributes", 39 pages.

Folsom, "Turning a Novel Into a Screenplay", WritersDigest.com, retrieved on Jan. 31, 2013, at http:www.writersdigest.com/writing-articles/by-writing-genre/script-writing/turning-a-no, 2008, 3 pages.

Office Action for U.S. Appl. No. 12/487,136, mailed on Jun. 9, 2011, Tom Killalea et al., "Presentation of Written Works Based on Character Identities and Attributes", 16 pages.

Office action for U.S. Appl. No. 13/438,541, mailed on Sep. 24, 2012, Killalea et al., "Presentation of Written Works Based on Character Identities and Attributes", 4 pages.

"Systems and Methods for Selection of Multiple Voices for Document Narration", Specification of U.S. Appl. No. 61/144,947, filed Jan. 15, 2009.

Office action for U.S. Appl. No. 13/438,541, mailed on Nov. 18, 2013, Killalea, et al., "Presentation of Written Works Based on Character Identities and Attributes", 50 pages.

* cited by examiner

VISUALLY DISTINGUISHING PORTIONS OF CONTENT

BACKGROUND

The continued proliferation of digital content items has led to an increase in the availability of such content items, as well as an increase in the availability of electronic devices and applications used for consuming these content items. For instance, users may consume content items, such as electronic books (eBooks) and other types of digital text content items on an assortment of electronic devices. As the number of textual content items and devices for consuming textual content items continues to increase, users are ever more interested in enhancing their experiences while consuming these content items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Visually Distinguishing Presented Content

Figure 1:
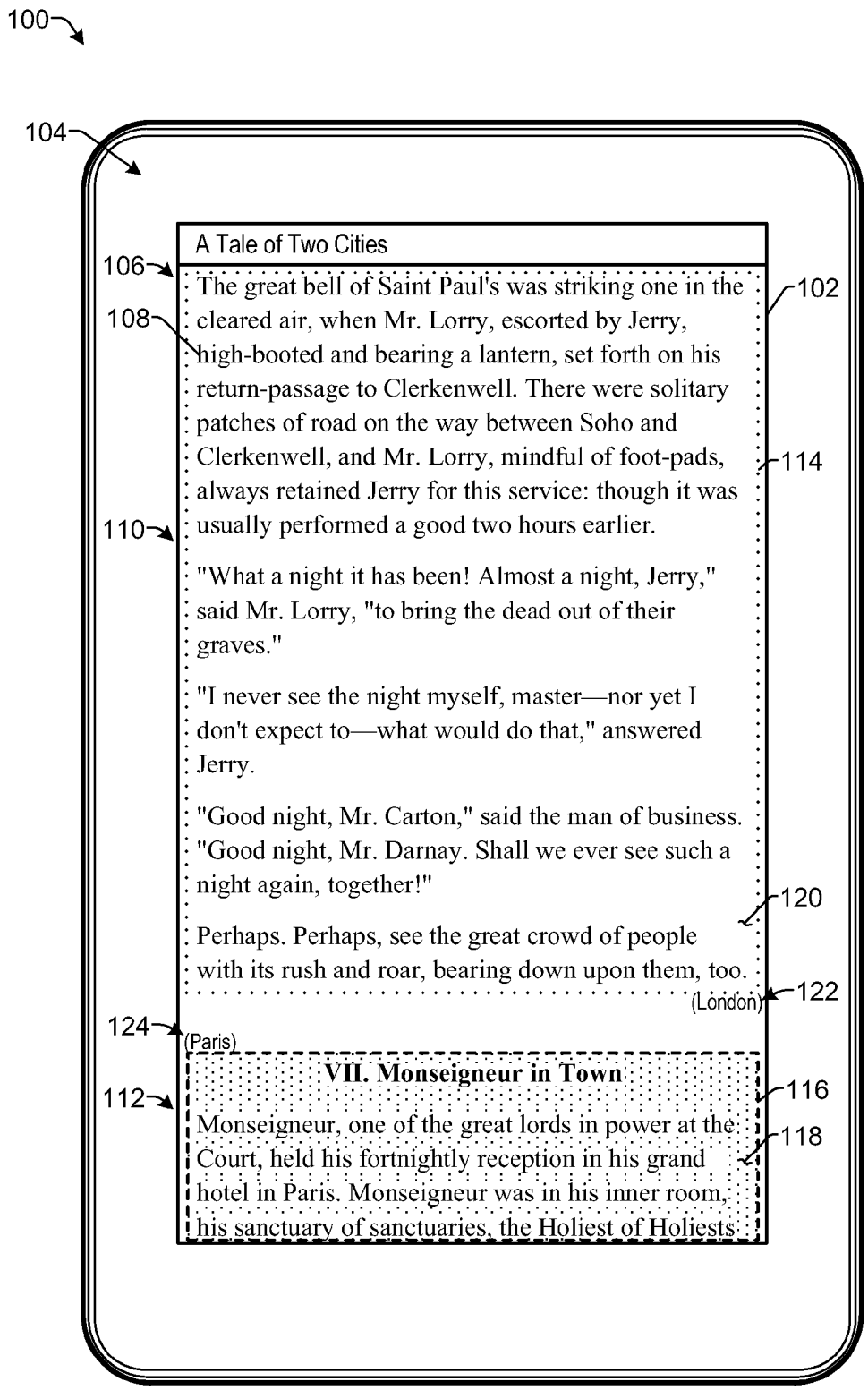
FIG. 1 illustrates an example of enhanced presentation of a content item according to some implementations.

This disclosure includes techniques and arrangements for presenting content of a digital content item. For instance, an electronic device may present content, such as text, on a display associated with the electronic device. In some examples, a user of the electronic device may choose to have a portion of the content augmented or visually distinguished, such as through highlighting, color coding, bolding, italicizing, underlining, outlining, encircling, using different text fonts or text styles, adding graphical elements, or other techniques that visually distinguish one portion of content from another. Alternatively, the user may elect to hide content associated with one or more selected categories of the content item, thereby at least partially visually distinguishing the remaining portions of content that are not hidden from presentation.

As one example, the user may select one or more categories, such as term categories or aspect categories, of the content to be visually distinguished when the content item is presented on the electronic device. In some implementations, a user interface may be presented to the user to enable the user to select the one or more categories of the content item to be visually distinguished. For instance, the user may select one or more categories of the content item, such as related to one or more characters/people, places/settings, topics, organizations/groups, things, events, themes, relationships, interactions, phrases, and so forth, or individual terms from one or more of the categories. Content associated with the selected categor(ies) or term(s) may then be visually emphasized or visually distinguished in the displayed text of the content item during presentation of the content item. Further, in some examples, the user may customize the appearance of the visually distinguishing graphic schemes, such as by selecting particular colors or graphical features to correspond to and visually distinguish particular places, characters, organizations, things, etc., in the content item.

For instance, suppose that a user of an electronic device is reading an electronic book (eBook) in which the action of the story takes place at four different places or settings, e.g., an apartment, a restaurant, a park and a hospital. The user may elect to have each of these locations highlighted in the text of the eBook when presented on the electronic device. As one example, the text corresponding to action (e.g., description and dialogue) that takes place at the apartment may be color coded with a first color; text corresponding to action that takes place at the restaurant may be color coded with a second color; text corresponding to action that takes place at the park may be color coded with a third color; text corresponding to action that takes place at the hospital may be color coded with a fourth color; and text that cannot be attributed to any particular location may be left unhighlighted. Thus, the user may thumb through the eBook and, based on the visual enhancement, easily identify which portions take place at each of the four settings in the book, and how much of the action takes place at each setting. In addition, the user may be presented with a user interface to enable the user to control which of the places or settings are visually distinguished. For example, the user may elect to have highlighted only the portions of the book that take place at the hospital, while the other portions may remain unhighlighted. Further, while color coding or highlighting is described in this example, any other technique for visually distinguishing one portion of text from another may be used in the implementations herein.

For discussion purposes, some example implementations are described in the environment of emphasizing or visually distinguishing content, such as text or images, in connection with an eBook or other content item. However, the implementations herein are not limited to the particular examples provided, and may be extended to other types of content items and other types of content configurations, as will be apparent to those of skill in the art in light of the disclosure herein.

Example Interfaces

FIG. 1 illustrates an example electronic device 100 able to present a content item having one or more visually enhanced portions according to some implementations. The electronic device 100 may be implemented as any of a number of different types of electronic devices, as discussed further below. The electronic device 100 may include, or may have associated therewith, a display 102 to present an interface 104 for displaying a content item 106. In some types of electronic devices 100, the display 102 may be a touch-sensitive display configured with a sensor to sense a touch input received from an input effecter, such as a finger of a user, a stylus, or the like. Thus, the touch-sensitive display may receive one or more touch inputs, stylus inputs, selections of text, and so forth.

In other implementations, the display 102 may be non-touch sensitive. Accordingly, in addition to, or as an alternative to, a touch sensitive display, the electronic device 100 may include various external controls and input devices. For example, some implementations (not shown in FIG. 1) of the electronic device 100 may include a virtual or physical keyboard, a mouse, a pointing stick, a touchpad, a trackball, a joystick, a remote control, buttons and/or various other controls for performing various desired inputs and interactions with the electronic device 100 and the content item 106 presented on the display 102. Additionally, in some implementations, one or more voice commands may be used to control or interact with the content items or interfaces herein. Further, in some examples, a user's eye position or point of focus may be detected to serve as inputs or commands. Thus, implementations herein are not limited to any type of input devices, techniques, or controls.

In some cases, the content item 106 may be a book or electronic book (eBook) including text 108, such as one or more pages of text. For example, the display 102 may present the text 108 of an eBook and any images, illustrations, tables, maps, or graphic elements that might be contained in the eBook. The terms "book" and/or "eBook," as used herein, may broadly include electronic or digital representations of printed works, as well as digital content that may include text, multimedia, hypertext, and/or hypermedia. Examples of content items 106 may include, but are not limited to, electronic versions of books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth, as well as other types of content items including text that the user may view or interact with using the electronic device 100. Accordingly, a content item 106 may include any readable or viewable textual content that is in electronic or digital form.

In the illustrated example of FIG. 1, suppose that a content item 106 that a user is currently consuming is an eBook version of *A Tale of Two Cities* by Charles Dickens, and that the user has specified that scenes of the book that take place in London are to be distinguished from scenes of the book that take place in Paris. Thus, during presentation of content of the content item, a first displayed portion 110 of the content item 106 that takes place in London may be visually distinguished from a second displayed portion 112 of the content item 106 that takes place in Paris.

In this example, the portion 110 that takes place in London is distinguished by being outlined or bordered by a dotted line 114, while the portion 112 that takes place in Paris is distinguished by being outlined or bordered by a dashed line 116 and by having a background 118 that is a different color or pattern from a background 120 of the London portion 110. Furthermore, in some examples, a label, indicator, or graphic may optionally be included, such as at the beginning and/or end of each portion related to a place. For instance, a label "London" 122 may be located adjacent to the end of the London portion 110, and a label "Paris" 124 may be located adjacent to the beginning of the Paris portion 112. The labeling may be useful for reminding a user of the relevance of the graphic, background color, text style, or the like, in association with a particular category of the content item 106. Accordingly, the configuration of FIG. 1 enables a user to visually distinguish the locations and transitions in the content item of action that occurs in a first place and action that occurs in a second place, without having to actually read the corresponding text. Techniques for identifying the beginnings and endings of text associated with different places or settings in a content item are discussed additionally below.

Figure 2:
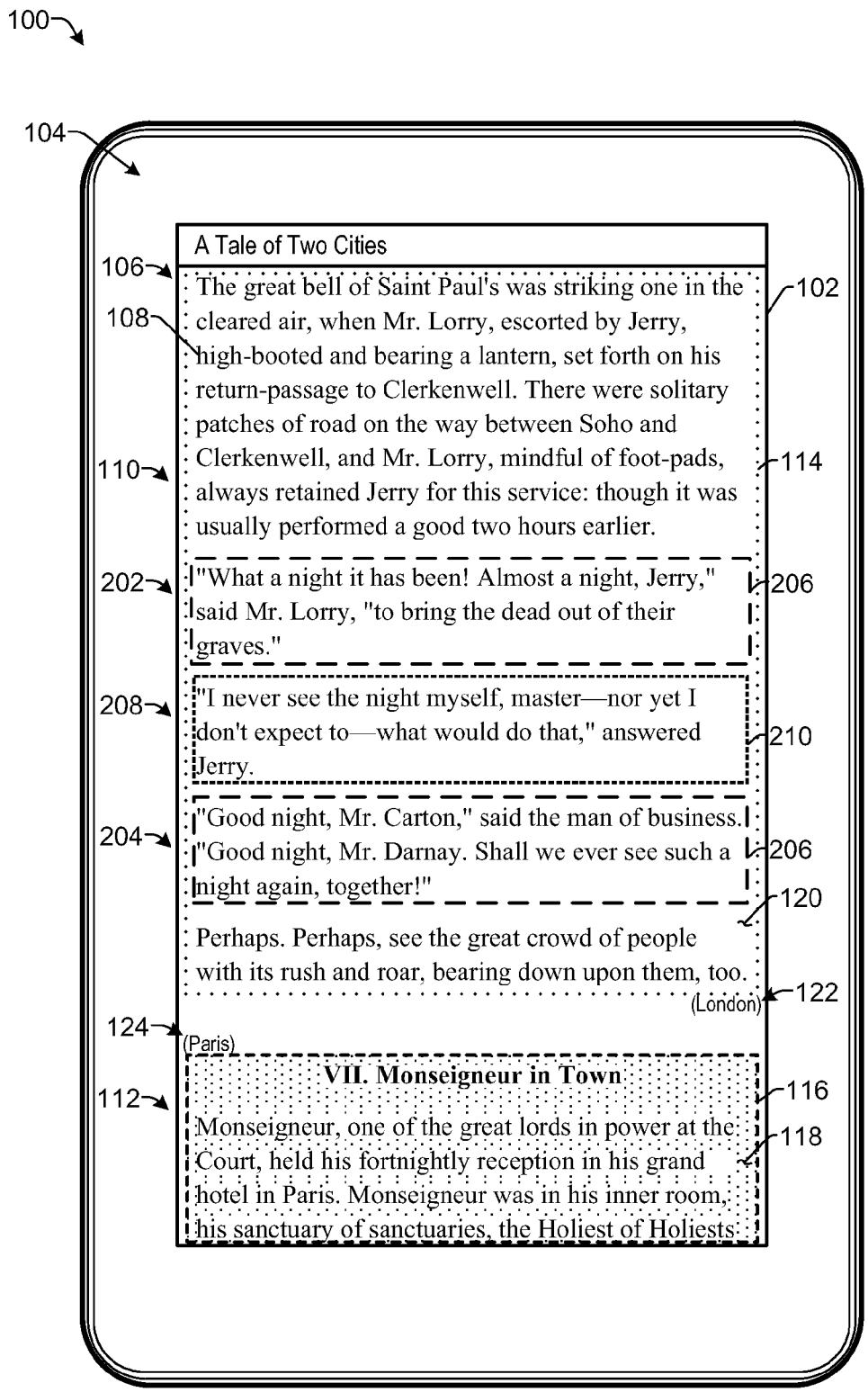
FIG. 2 illustrates an example of enhanced presentation of a content item according to some implementations.

FIG. 2 illustrates the example electronic device 100 including the interface 104 and content item 106 of FIG. 1 having additional categories selected to be visually distinguished according to some implementations. Suppose that the user has further specified that portions of the text 108 related to particular characters be visually distinguished when the content item 106 is presented on the display 102. In this example, portions 202 and 204 of the text containing dialogue by the character Jarvis Lorry are encircled with dashed lines 206, while portions 208 of the text containing dialogue by the character Jerry Cruncher are encircled with a rectangular-dot dotted line 210. Additionally, while dashed lines 206 and dotted line 210 are used in the black-and-white drawing of this example, color-coding or any other suitable graphic effects may alternatively be used for distinguishing the portions of dialogue related to Jarvis Lorry from the portions of dialogue related to Jerry Cruncher.

Furthermore, the second portion of content 204 including the dialogue associated with Jarvis Lorry is identified as corresponding to Jarvis Lorry based on an alternate name (i.e., "man of business") for Jarvis Lorry. For example, as discussed additionally below, various techniques may be used to identify alternate names of the various characters in a particular content item. These techniques may include referring to list of known nicknames; referring to online resources such as Wikipedia®, Shelfari®, IMDb® (Internet Movie Database), and other online encyclopedias, dictionaries, wikis, or other reference resources, and/or by relying on crowd-sourced information provided by one or more of website users, user of electronic devices 100, book enthusiast forums, fan sites for particular authors, or the like. Further, while the example of FIG. 2 shows that text associated with two categories of the content item 106, i.e., places and characters, is visually distinguished, text associated with numerous other categories may also, or alternatively, be visually distinguished in a similar manner. Accordingly, implementations herein enable contemporaneous display of visually distinguishing graphic effects for a variety of different categories of a content item 106, including characters/people, places/settings, topics, organizations/groups, things, events, themes, relationships, interactions, phrases, and so forth.

Figure 3:
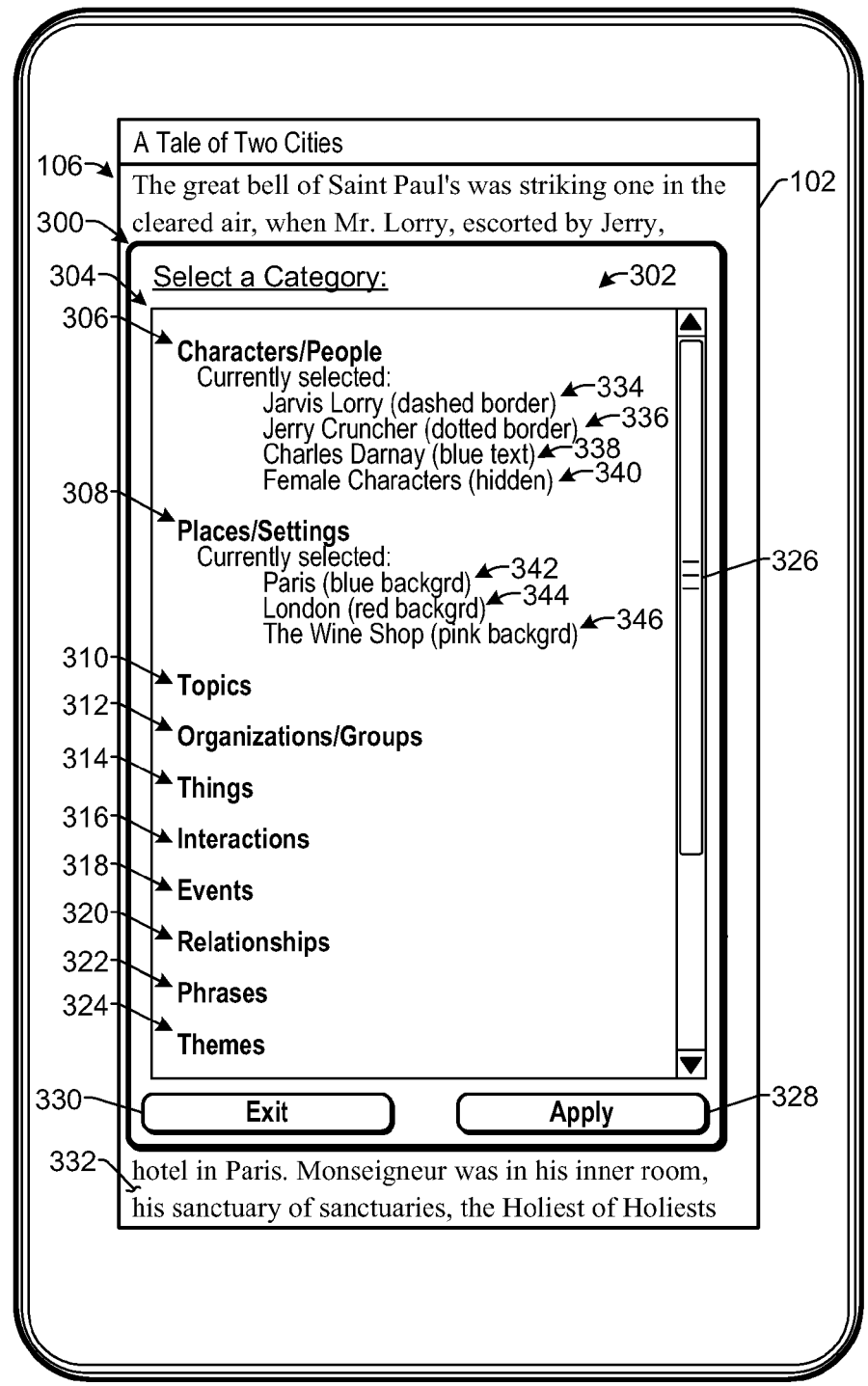
FIG. 3 illustrates an example user interface for selecting one or more categories of a content item according to some implementations.

FIG. 3 illustrates an example user interface 300 to enable a user to select various categories of the content item 106 to be visually distinguished or hidden according to some implementations. In this example, the user may select one or more categories 302 that the user desires to have visually distinguished or hidden, such as by using an input object or device. For instance, in the case that the display 102 is a touch screen, the user may use a finger to select a desired category of the content item 106. Alternatively, the user may use a different type of input device such as a mouse, joystick, or any other suitable input device for selecting one or more categories of the content item 106, depending, at least in part, on a type of the electronic device 100 and a type of the content item 106. Thus, the electronic device 100 may present the user interface 300 that includes a listing 304 of categories 302 of the content item that are available to be selected.

Examples of categories that may be selected by the user include characters or people 306 mentioned in the content item; places or settings 308 at which action takes place in the content item; topics 310 discussed in the content item; organizations or groups 312 mentioned in the content item; things 314 of interest in the content item; interactions 316 between two or more characters in the content item; events 318 that take place in the content item; relationships 320 between two or more characters in the content item; phrases 322 of interest in the content item; and themes 324 in the content item, to name a few. Furthermore, the interface 300 may include a scrollbar or scroll control 326 that may be used to scroll down to access other additional categories and/or other controls/features as discussed additionally below. Accordingly, the list 304 of categories shown in FIG. 3 is non-exhaustive and numerous other categories may be included, such as a citation provided in the content item, or a time period associated with portions of the content, depending on the type of the content item (e.g., work of fiction or non-fiction) and the content of the content item.

Further, in some examples, the categories displayed in the interface 300 may be categories relevant to just a part of the content item 106, rather than the entire content item 106. For example, a user may select a part of the content, such as a chapter, a page, one or more paragraphs, or the like, and may cause presentation of the interface 300. The interface 300 may then present categories and terms that are available to be selected from within the selected part of the content item, rather than from the entire extent of the content item.

In either case, the user may tap or otherwise select one of the categories 306-324 to access additional interfaces, such as for selecting a particular subset of terms and/or attribute categories corresponding to the category. For instance, as described below, the user may select particular characters, particular places, particular topics, etc., to be visually distinguished in the content item 106. When the user has completed selection of one or more categories 302, or a subset of terms and/or attribute categories corresponding to the category, the user may select an "apply" button or control 328 to close the interface 300 and have any changes applied to the content item 106. Alternatively, if the user decides not to make any changes the user may select an "exit" button or control 330. In some examples, the interface 300 may be displayed overlaid on top of a currently displayed page 332 of the content item 106. In other examples, the interface 300 may be displayed as a separate window, such as without the content item being currently open or displayed on the electronic device 100. In still other examples, the interface 300 may be displayed in a side-by-side configuration with the content item 106 so that the user may immediately view any changes made to visually distinguish the various categories of the content item 106.

The interface 300 may further display any currently selected categories or terms, along with a graphic characteristic used for distinguishing that category or term. In the illustrated example, the interface 300 shows that, with respect to the character category, character terms currently selected include several character names: Jarvis Lorry, having an indicator 334 that indicates the associated text is visually distinguished by being bordered with a dashed lined; Jerry Cruncher, having an indicator 336 that indicates the associated text is visually distinguished by being bordered with a dotted line; and Charles Darnay, having an indicator 340 that indicates the associated text is visually distinguished by being presented in blue text.

Furthermore, the example interface 300 shows that a character attribute category, "all female characters," is currently selected and has an indicator 340 that indicates the associated text is currently hidden from presentation when the content item is presented. For example, hiding (which may include graphical effects such as fading, shrinking, graying-out, or otherwise not fully displaying) a portion of content can help to visually distinguish the remaining content that is visible or displayed. Thus, as discussed below, when a user selects a particular category, attribute, or term in the interfaces herein, the user may be presented with the option of selecting visually distinguishing graphics to user, and may also be presented with the option of hiding the selected category, attribute or term.

The example interface 300 further shows that places currently selected include: Paris, having an indicator 342 that indicates the associated text is visually distinguished by having a blue background; London, having an indicator 344 that indicates the associated text is visually distinguished by having a red background; and the Wine Shop, having an indicator 346 that indicates the associated text is visually distinguished by having a pink background. Accordingly, the interface 300 enables the user to view quickly determine from indicators 334-346 which graphics settings currently apply to which categories of the content item 106, and to further change the settings by selecting one or more of the categories 302. For example, the user may tap on one of the indicators 334-346 to open an interface to select a different graphic effect or to hide text for a particular category, attribute or term.

Figure 4:
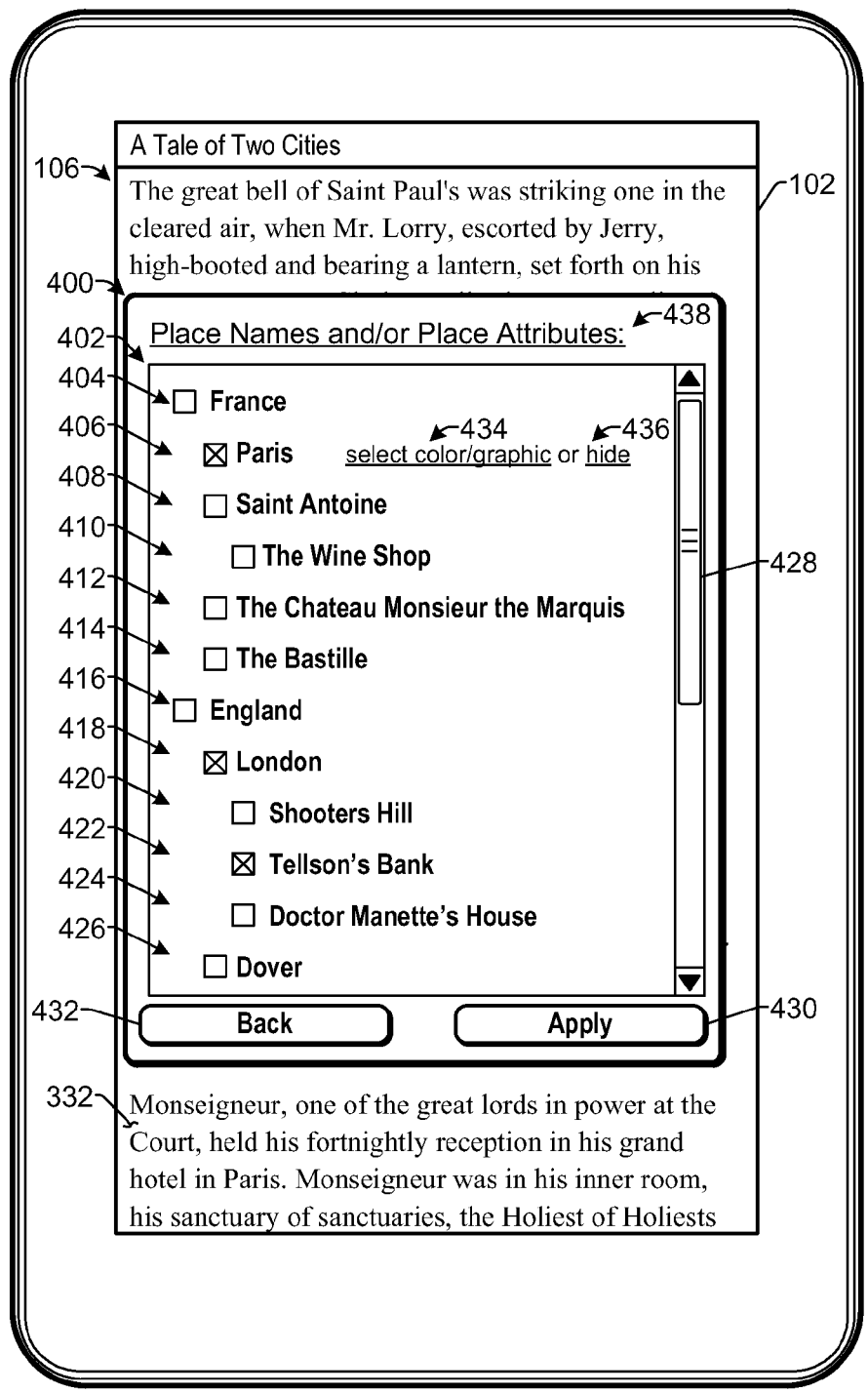
FIG. 4 illustrates an example user interface for selecting a place name and/or place attribute according to some implementations.

FIG. 4 illustrates an example of an interface 400 that may be used to select particular places, scenes, settings, etc., (hereafter referred to as "places") and/or place attributes according to some implementations. As one example, the user may access the interface 400 from the interface 300, such as by tapping or clicking on the places/settings category 308. The interface 400 may include a plurality of terms and/or attribute categories corresponding to the category of places in the content item 106. In the illustrated example, the interface 400 includes a listing 402 of place names and/or place attributes including France 404, Paris 406, Saint Antoine 408, the Wine Shop 410, the Château Monsieur the Marquis 412, the Bastille 414, England 416, London 418, Shooter's Hill 420, Tellson's Bank 422, Doctor Manette's house 424, and Dover 426. Furthermore, a scrollbar or scroll control 428 may be provided to enable the user to scroll down to select additional places or place attributes.

The places and place attributes listed in the interface 400 will typically depend on the content and type of the content item 106. Examples of place attributes may include places that are on land or on water, places that are described during a current time period or at a time period in the past, places that are indoors or outdoors, places that are within a larger common geographic region, and numerous other types of place attributes, depending on the particular content item. When the user has finished selecting one or more places or place attributes, the user may select an "apply" button or control 430 to apply the selected places. On the other hand, if the user decides not to make any changes the user may select the back button 432 to return to the previous interface 300.

In some examples, when the user selects a term, such as a place name or place attribute, the user may be able to also select a graphic characteristic or effect that will be used to visually distinguished text associated with the selected place name a place attribute. For example, suppose that the user has selected Paris 406, such as by tapping or clicking on the word Paris or an adjacent check box in the interface 400. Upon making the selection, additional selectable links may be displayed including a link 434 to select a color or graphic scheme to be applied to the text for the selected place. Selection of this link 434 may result in presentation of a menu or interface to enable the user to select a particular color from among a plurality of available colors and/or a particular graphic effect such as underlining, highlighting, bolding, encircling, selecting dashed lines, solid lines, italicizing, outlining, strikethrough, adding or changing a background pattern, fading or graying-out, changing a font size, type or style, or adding one or more graphical elements, such as icons, symbols, labels, and so forth. If the user chooses not to select a graphic scheme, the device may employ a default graphic scheme that is unique with respect to other graphic schemes already selected for other selected categories or terms.

Alternatively, or additionally, the user may be presented with a link 436 that may be selected to hide the portions of text related to the selected place. For example, selection of the "hide" link 436 may result in all of the text relating to action that takes place in Paris being hidden from presentation when the content of the content item is presented on the display 102. Subsequently, to unhide the content related to Paris, the user may access the interface 400 and unselect a box adjacent to Paris 406.

Furthermore, in some examples the listing 402 of place names and place attributes may be arranged according to a hierarchy, such as a geographical hierarchy or any other suitable type of hierarchy based on a common attribute shared by a plurality of the places. In the illustrated example, the places 404-426 are arranged according to a geographical hierarchy. Thus, Paris 406, Saint Antoine 408, the Wine Shop 410, the Château Monsieur the Marquis 412, and the Bastille 414 are all located in France 404. The user may select France 404, such as by tapping on the word "France" or a check box located adjacent to the word "France." In some examples, when the user selects a higher-level geographic region, e.g., France 404, all of the lower-level geographic regions contained in the higher-level geographic region may be automatically selected also. The user may then unselect any of the particular lower level regions that the user does not desire to have visually distinguished.

For example, suppose the user selects London 418, which results in the automatic selection of Shooter's Hill 420, Tellson's Bank 422, and Doctor Manette's house 424, which are all located in London. The user may then unselect Shooter's Hill 420 and Doctor Manette's house 424, which results in visually distinguishing text associated with Tellson's Bank 422 and other parts of London that are not Shooter's Hill 420 or Doctor Manette's house 424. Consequently, the interface 400 enables the user to filter which places in a larger geographic region are visually distinguished. Alternatively, of course, in other examples, the user may manually select each of the desired places 404-426 by tapping the place name and/or a check box located adjacent to each place name. Additionally, in some examples, the user may select all places and place attributes in the list 402 by tapping a "Place Names and/or Place Attributes" title 438 of the menu 400. Tapping the title 438 again may unselect or clear all previously selected place names or place attributes.

Figure 5:
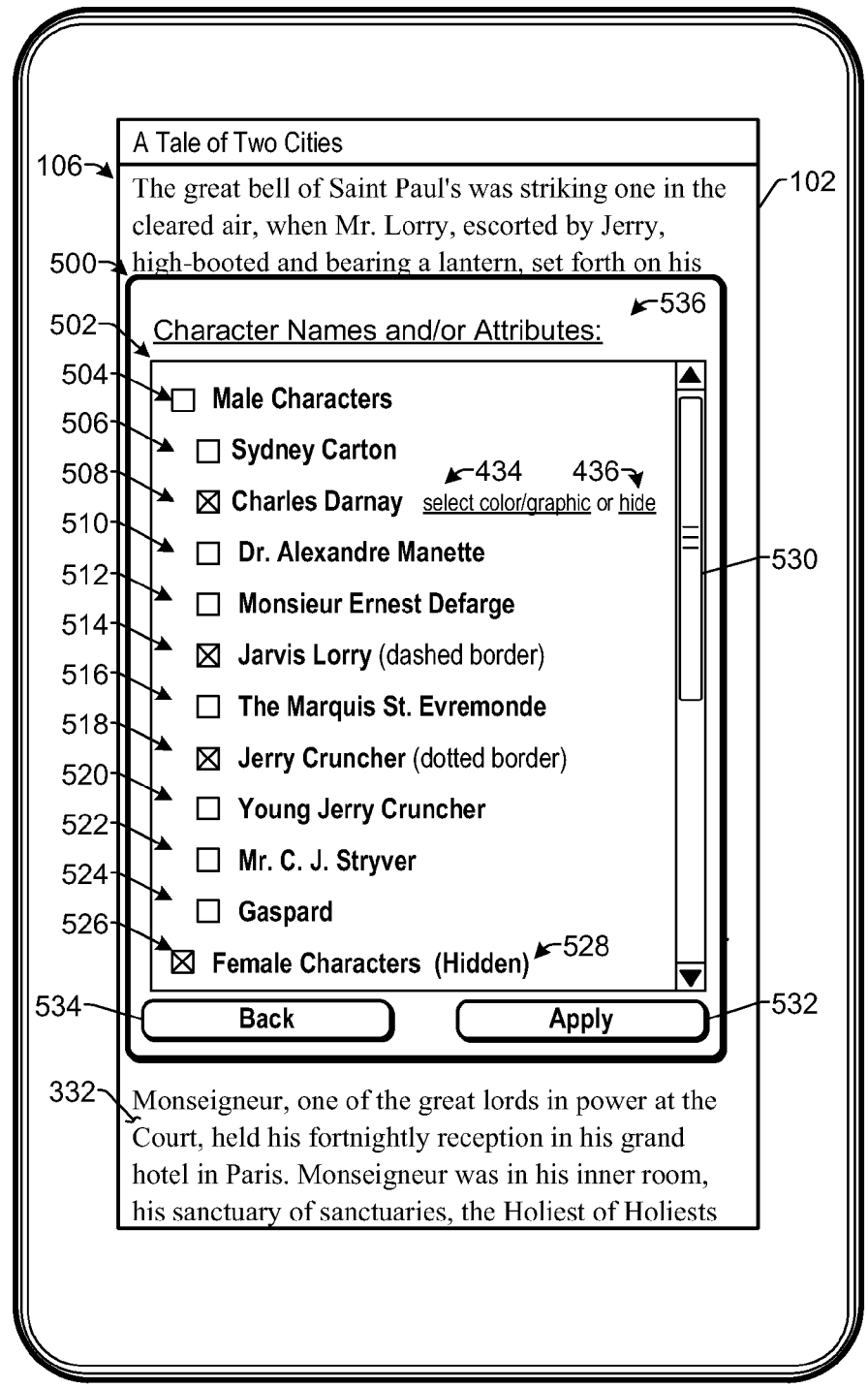
FIG. 5 illustrates an example user interface for selecting a character name and/or character attribute according to some implementations.

FIG. 5 illustrates an example of a user interface 500 that may be used to select particular character terms, such as character names and/or character attributes, according to some implementations. In some cases, the character names may be arranged according to a common attribute, such as gender, age, nationality, or any other desired attribute. In the illustrated example, the interface 500 includes a listing 502 of character names arranged according to gender including male characters 504 under which is listed Sydney Carton 506, Charles Darnay 508, Doctor Alexander Manette 510, Monsieur Ernest Defarge 512, Jarvis Lorry 514, the Marquis St. Evremonde 516, Jerry Cruncher 518, Young Jerry Cruncher 520, Mister C. J. Stryver 522, Gaspard 524. The list 502 further includes the attribute female characters 526, the names of which may be made visible if the user scrolled down in the interface 500.

Similar to the interface 400 described above, a user may select a character name, such as to distinguish text associated with the character when the content item 106 is present. Further, the user may similarly be provided the link 434 to select a color and graphic scheme and/or the link 436 to hide text associated with a selection. In the illustrated example, the user has selected Charles Darnay 508, and may select a color and graphics scheme. Alternatively, as mentioned above, the user may ignore the links 434, 436 and a default graphics scheme may be selected by the device 100 that is unique in distinguishing the selected character from other selected categories.

Additionally, in this example, as indicated at 526, the user has selected all female characters and elected to hide the text associated with all female characters. A "hidden" indicator 528 may be located adjacent to the female characters attribute 526 to indicate that female characters are hidden. For example, by selecting the female characters attribute 526, all of the female characters in the listing 502 may be selected automatically. Should the user wish to unhide specific female characters, the user may unselect particular female characters by scrolling down in the interface 500 using a scrollbar or scroll control 530. When the user has selected the desired character names or character attributes, the user may select an "apply" button or control 532. Alternatively, if the user would like to return to the previous interface 300 without making any changes the user may select a "back" button or control 534. Furthermore, if the user desires to select all character names and character attributes the user may select a "character names and/or character attributes" title 536. Likewise, to unselect all character names, the user may again select the title 536.

Figure 6:
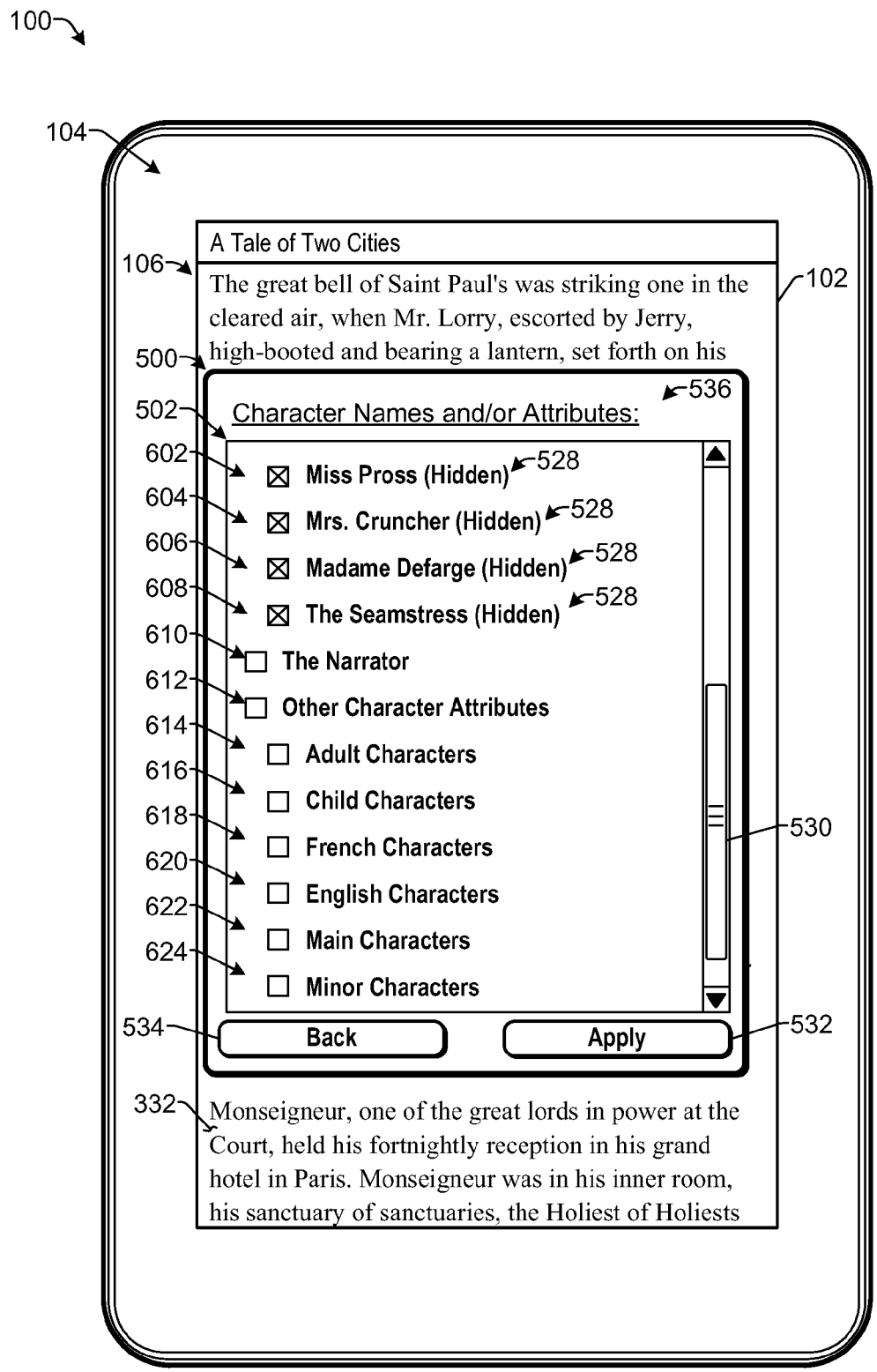
FIG. 6 illustrates an example user interface for selecting a character name and/or character attribute according to some implementations.

FIG. 6 further illustrates the example user interface 500 that may be used to select particular characters and/or character attributes according to some implementations. In this example, suppose that the user has used the scroll control 530 to scroll further down the character term list 502. Thus, some of the female characters are visible in the interface 500, namely, Miss Pross 602, Mrs. Cruncher 604, Madame Defarge 606, and the seamstress 608, each of which has a "hidden" indicator 528 located adjacent thereto indicating that text associated with that character will be hidden during presentation of the content item 106. The list 502 also includes the narrator 610, which, while typically not a character per se, enables control of text associated with a narrator of the story. For example, the text attributed to the narrator may be visually distinguished and or hidden just as text associated with a character or other category in the content item 106.

The list 502 may further include other character attributes 612, which may include a plurality of subcategories such as adult characters 614, child characters 616, French characters 618, English characters 620, main characters 622, and minor characters 624 as several examples. For instance, the user may select French characters 618, which will result in the selection of all the characters associated with the French character attribute such as Monsieur and Madame Defarge, the Marquis St. Evremonde, and so forth. The user may then unselect certain of these characters individually, if desired.

Figure 7:
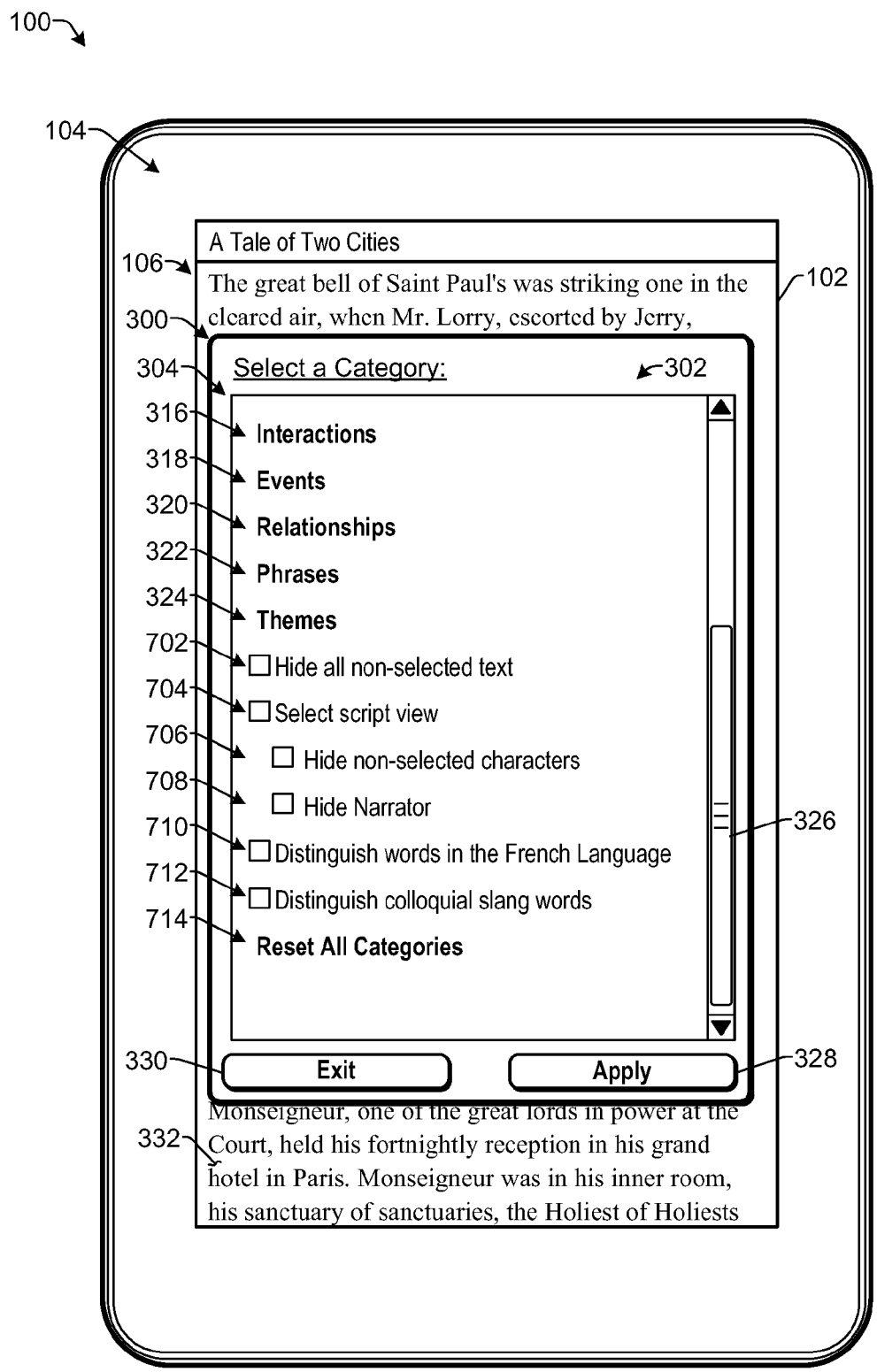
FIG. 7 illustrates an example user interface for selecting a category of a content item according to some implementations.

FIG. 7 further illustrates the example user interface 300 for selecting a category of a content item according to some implementations. In this example, suppose that the user has used the scroll control 326 to scroll further down the list 304 to select additional categories 302. For instance, as indicated at 702, such additional categories may include hiding of all non-selected text. Thus, the user may select this category to hide or visually toggle off and on all text that is not associated with one or more categories currently selected in the content item.

As another example, the additional selectable categories may include the ability to select a script view format for the content item, as indicated at 704. For instance, the script view may present the content item in display format such that the name of a character is shown on the left side of a page and adjacent to dialogue attributed to the character, similar to the format a script for a play or screenplay. The script view category may include additional options, such as hiding text associated with non-selected characters, indicated at 706, and as indicated at 708, hiding text attributed to the narrator.

As another example, the additional selectable categories may include the ability to visually distinguish words in a foreign language, such as indicated at 710 for highlighting or otherwise visually distinguishing words in the French language. Thus, the user interface 300 may include a control able to be selected to visually distinguish words in a language different from a primary language of the content item 106. Similarly, as indicated at 712, the additional categories may include a control that may be selected to visually distinguish words that are colloquialisms or slang words in a particular language. Furthermore, the interface 300 may include a "reset all categories" option, as indicated at 714, which may be selected by a user to unselect or clear all previously selected categories of the content item. Accordingly, numerous different types of categories of a content item 106 may be selected to be visually distinguished or enhanced in a content item with the foregoing going being merely several examples provided herein for discussion purposes.

Figure 8:
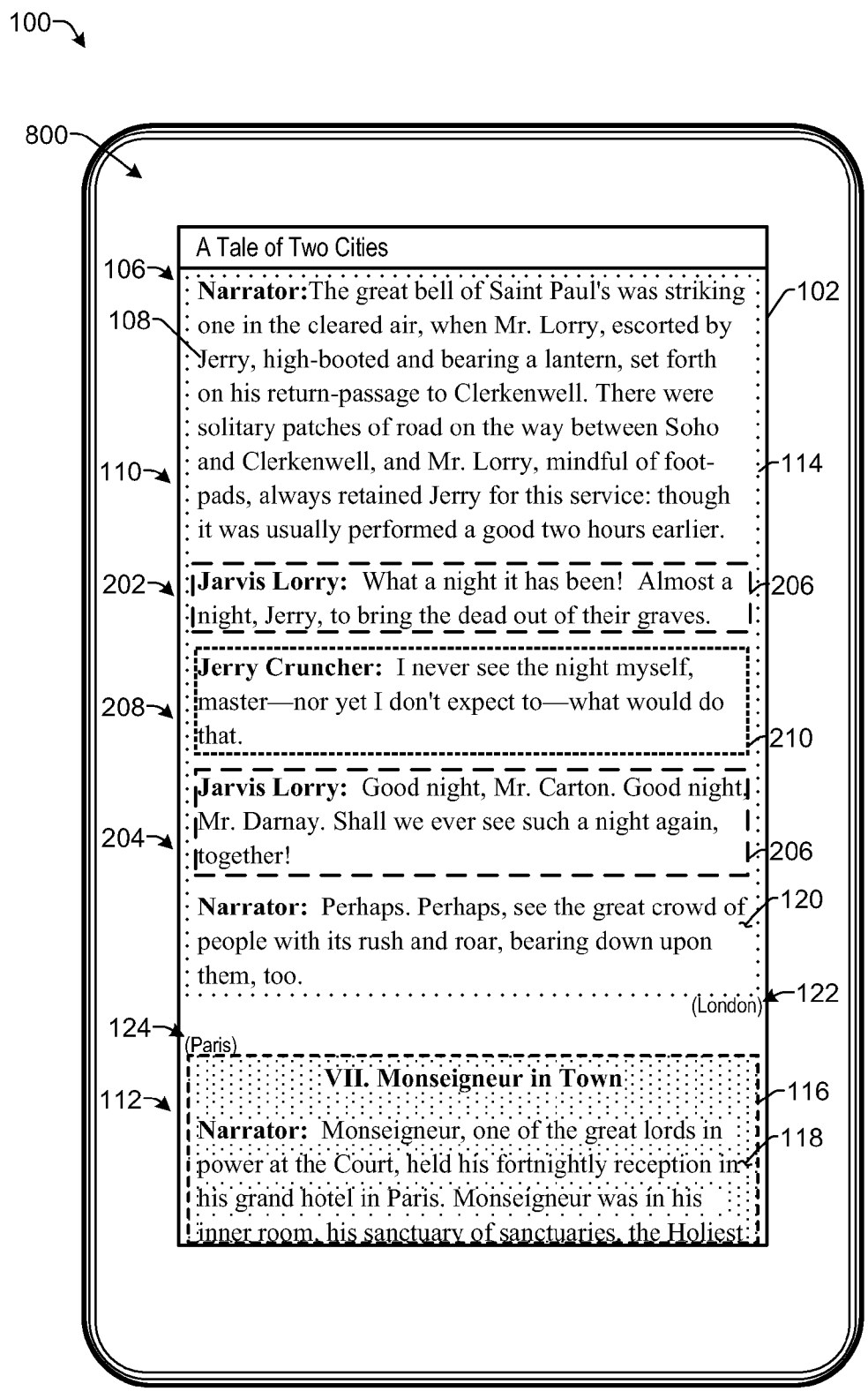
FIG. 8 illustrates an example of enhanced presentation of a content item rendered in a script view format according to some implementations.

FIG. 8 illustrates an example of enhanced presentation of a content item 106 rendered in a script view format in a script view interface 800 according to some implementations. The script view interface 800 may be presented in response to user selection of the script view category 704 discussed above with respect to FIG. 7. In this example, the text 108 of the content item 106 has been rearranged into a script view so that the name of each character is located on the left-hand side of the page adjacent to dialogue associated with that character. Furthermore, previously selected categories and graphics schemes may be maintained in the script view. For example, the portions of content 202, 204 attributable to Jarvis Lorry may be visually distinguished from the portion 208 attributable to Jerry Cruncher as well as visually distinguished from the remainder of the text 108 of the content item 106.

Further, as discussed additionally below, alternate names may be identified in the content item for characters, places, organizations, and other terms in the content item. For instance, in the text portion 240, the character name "Jarvis Lorry" is not used, but rather, "man of business" is used instead. Sources of information external to the content item may be used to identify, correlate and disambiguate the alternate names used in a content item for various terms. A primary name may then be selected for each term that has one or more alternate names. For example, the character "Jarvis Lorry" may also be referred to in the text as "Mr. Lorry" and "man of business," with "Jarvis Lorry" being selected as the primary name for this character. Accordingly, when the content is rearranged in the script view interface 800, the primary name of the character, i.e., "Jarvis Lorry" may be used as the character name for the portion 204, rather than the alternate name "man of business." Similarly, in the script view, the primary name may be used as the character name next to portions of dialogue that include pronouns, such as "he said . . . " or for portions of dialogue that do not include any indication of which character is speaking, such as when dialogue alternates between two characters.

In addition, the graphic elements for visually distinguishing other categories of the content item may also be maintained in the script view interface 800. For instance, graphics scheme of the dashed borderline 116 and colored background 118 may distinguish text associated with Paris from text associated with London having a graphic scheme with the dotted line 114 and background 120. Furthermore, as mentioned above, the user may elect to hide unselected categories of the content, such as the parts attributable to the narrator. As one example, this feature may be used for enabling an actor to study a script for a particular character, or for various other purposes.

Figure 9:
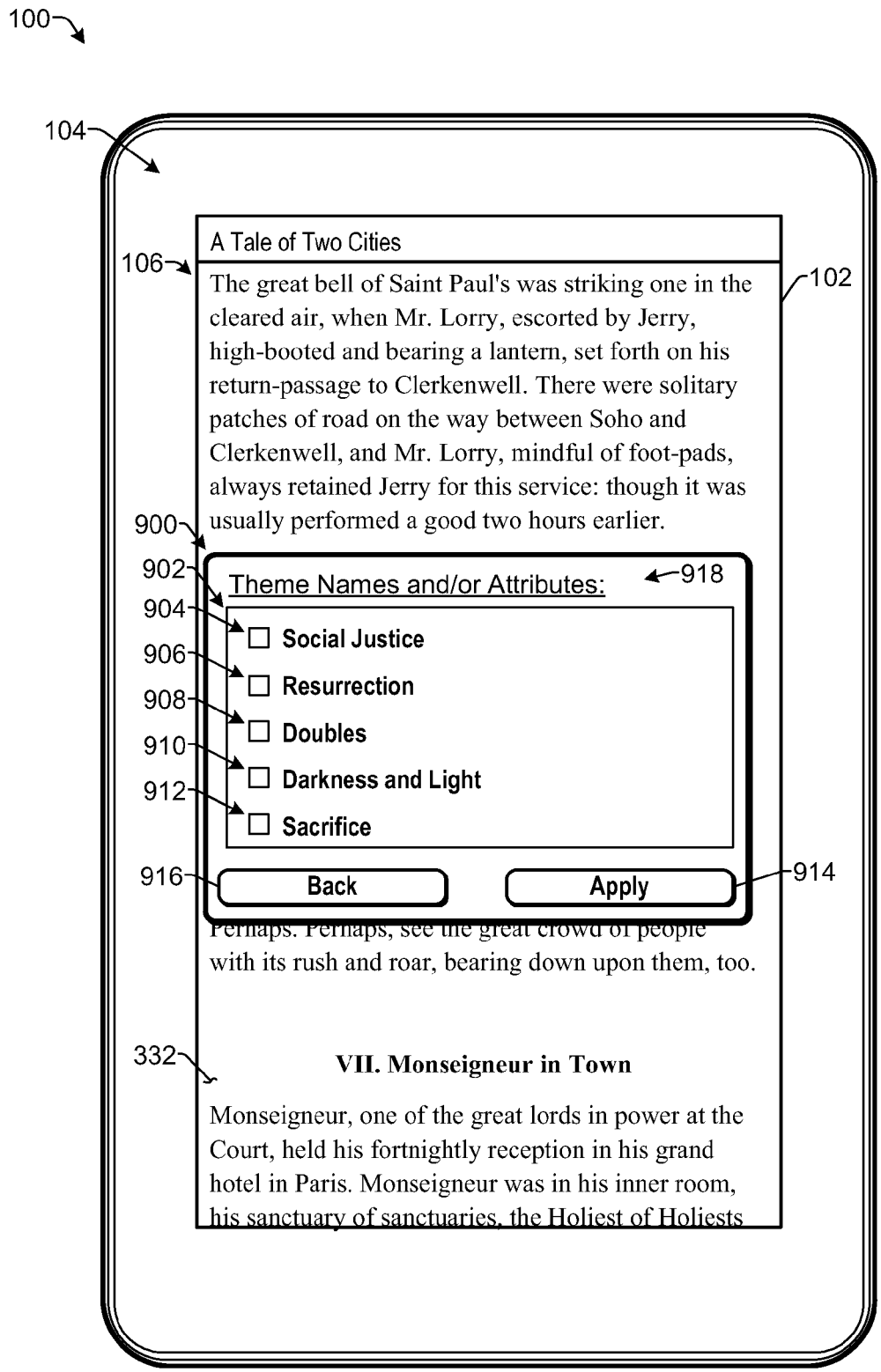
FIG. 9 illustrates an example user interface for selecting a theme name and/or attribute according to some implementations.

FIG. 9 illustrates an example user interface for selecting one or more themes or theme attributes according to some implementations. For example, in response to the user tapping or otherwise selecting the theme category 324 in the interface 300, the user may be presented with the interface 900 to select one or more themes or theme attributes from a list 902 of theme names and/or attributes for the content item 106. Examples of themes in the particular content item 106 may include social justice 904, resurrection 906, doubles 908, darkness and light 910, and sacrifice 912. Accordingly, the user may select one or more of the themes to have the text associated with a particular theme visually distinguished in the content item 106 when presented on the electronic device 100. Theme names in the content item 106, theme attributes, and text associated with themes may be determined from external content that is external to the content, such as from network accessible resources, crowd-sourcing, and the like, as discussed additionally below.

When the user has finished selecting one or more themes, the user may select an "apply" button or control 914 to apply the selected theme(s) and visually distinguish text associated with a particular theme. On the other hand, if the user decides not to make any changes, the user may select the "back" button 916 to return to the previous interface 300. If the user decides to select all themes, the user may select a "theme names and/or attributes" title 918, such as by tapping or otherwise selecting the title 918 to select all of the themes or theme attributes listed in the interface 900.

Figure 10:
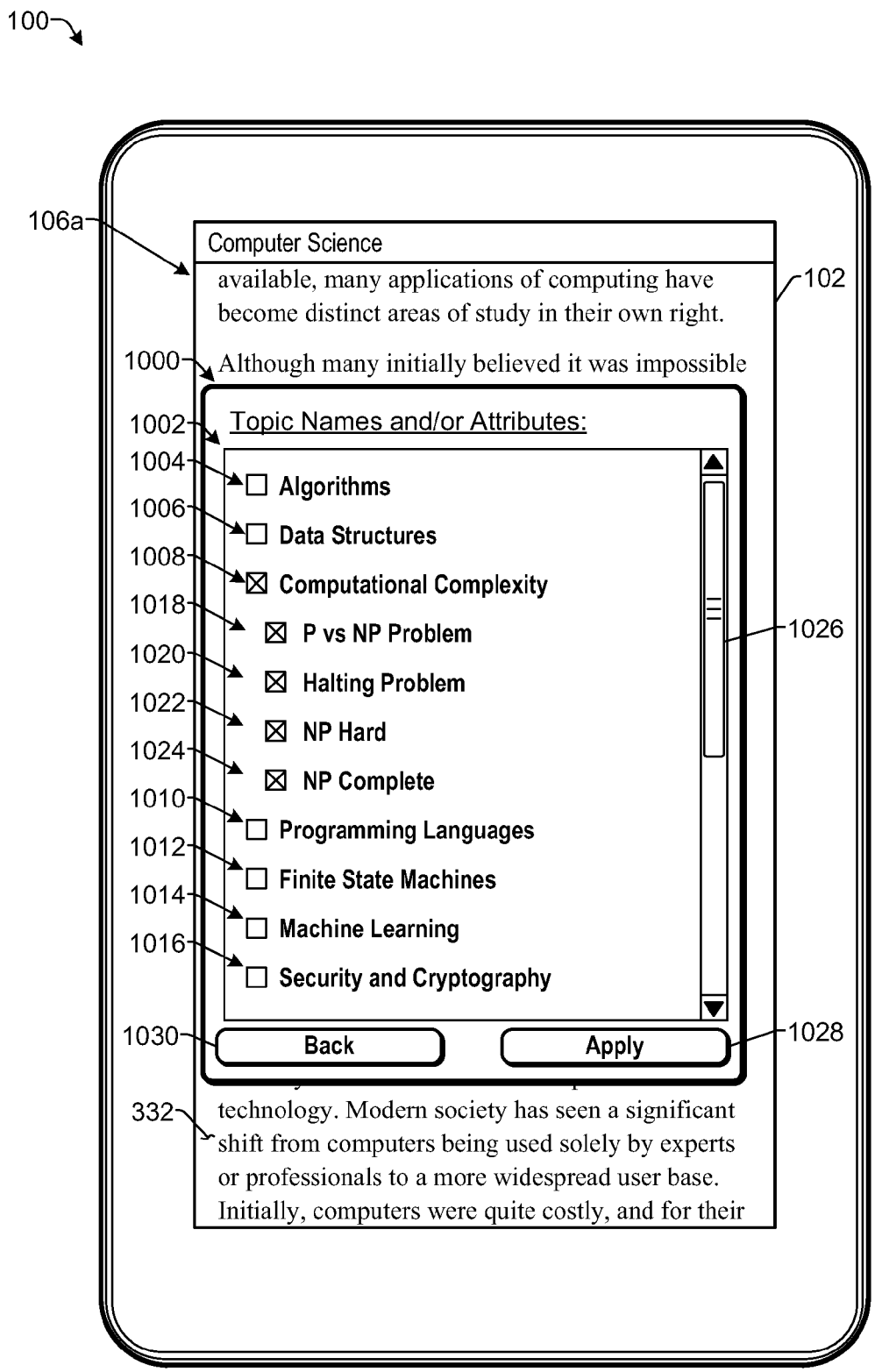
FIG. 10 illustrates an example user interface for selecting a topic and/or topic attribute according to some implementations.

FIG. 10 illustrates an example user interface 1000 for selecting a topic name and/or topic attribute according to some implementations. For example, implementations herein may identify topics that have relevance to the primary subject of the content item 106. As discussed below, some implementations may select one or more topics to include in the interface 1000 as selectable topic names or terms by determining the contribution that each candidate topic makes to other candidate topics derived from the content item. In the illustrated example, suppose that a content item 106*a* is a technical book on the subject of computer science that contains a plurality of different topics related to computer science. The interface 1000 may present a listing 1002 of the topic names and/or topic attributes, which in this example include algorithms 1004, data structures 1006, computational complexity 1008, programming languages 1010, finite state machines 1012, machine learning 1014, and security and cryptography 1016.

Suppose the user has selected computational complexity 1008. A plurality of subtopics or subcategories related to the selected topic name computational complexity 1008 may then be displayed in the interface 1000, which in this example include P vs NP problem 1018, halting problem 1020, NP hard 1022, and NP complete 1024. For example, in response to the user selection, the selected topic may be expanded to show the subtopics, and the subtopics may be displayed as already having been selected. The user may unselect one or more of the subtopics to effectively filter the text associated with the subtopics that will be visually distinguished in the content item 106*a*.

As with the other interfaces described above, the user may be provided the opportunity to select the graphical scheme, e.g., graphical effects, colors, etc., for distinguishing various selected topics and/or subtopics. Alternatively, default graphic schemes may be employed that are unique for each topic or subtopic. The interface 1000 may further include a scrollbar or scroll control 1026 to enable the user to scroll down to additional topics or topic attributes. For example, topic attributes may be at least in part dependent on the subject of the content item 106*a*, and may be a common link or common characteristic between two or more of the listed topics. When the user has finished selecting one or more topics or topic attributes, the user may select an "apply" button or control 1028 to apply the selected topic(s). On the other hand, if the user's decides not to make any changes the user may select the back button 432 to return to the previous interface 300.

From the foregoing examples, it may be seen that numerous different types of categories of a content item may be selected by a user to have the content associated therewith visually distinguished or hidden and thereby enhance the presentation of the content item. Thus, while several examples have been provided herein for discussion purposes, implementations herein are not limited to the particular examples provided and discussed, but may be extended to other categories, interfaces, graphic schemes and effects, and the like, as will be apparent to those of skill in the art in light of the disclosure herein.

Furthermore, in some examples, different users may share an electronic device and/or a library of content items. Thus, a first user may select various categories to visually distinguish or hide in a particular content item 106 maintained on a particular electronic device 100. A second user may log on to the particular electronic device 100 using a different user name from the first user and may access the particular content item 106. In some implementations, the categories selected by the first user to be visually distinguished or hidden are not visually distinguished or hidden with respect to the second user when the second user accesses the particular content item. Accordingly, the first user may have a first set of selection information for visually distinguishing a first set of selected categories for the particular content item, while the second user may have a second set of selection information for visually distinguishing a second set of selected categories of the content item that may be different from those selected by the first user. Accordingly, the electronic device 100 and/or a content provider may maintain selection information for each user so that when a particular user accesses the content item during a subsequent session, the user's settings and selections are maintained and displayed in the same manner as when the user finished an immediately previous session of interacting with the content item.

In some cases, the user may have multiple devices associated with a user account, each of which may be authorized to display a particular content item. Selection information regarding the user's selections of categories to be visually distinguished on a first user device may be synchronized to one or more of the user's other devices. For example, the selection information may be sent to a content provider, exclusive of the content item or the content selected, and may be synchronized to one or more other user devices. In some examples, when the user accesses the particular content item on the one or more other devices, the supplemental information synchronized to that device may be used to present the particular content item with the same visually distinguished categories made by the user for the particular content item on the first user device. In some cases, the content may be may visually distinguished automatically on the one or more other devices. In other cases, when the user accesses the particular content item on one of the other devices, the user may be first presented with an inquiry as to whether the user would like to have the particular content item displayed with the selected visually distinguished categories.

As another example, a user may be able to set preferences so that certain portions of a content item are visually distinguished automatically upon receipt of a content item. For instance, the user may specify that all the different places or settings in a book be visually distinguished automatically when a user accesses a new eBook, such as using default settings, so that the user does not have to access a user interface each time a new book is purchased to have the different places or settings visually distinguished. Various other use cases will be apparent to those of skill in the art in light of the disclosure herein.

Example Architecture

Figure 11:
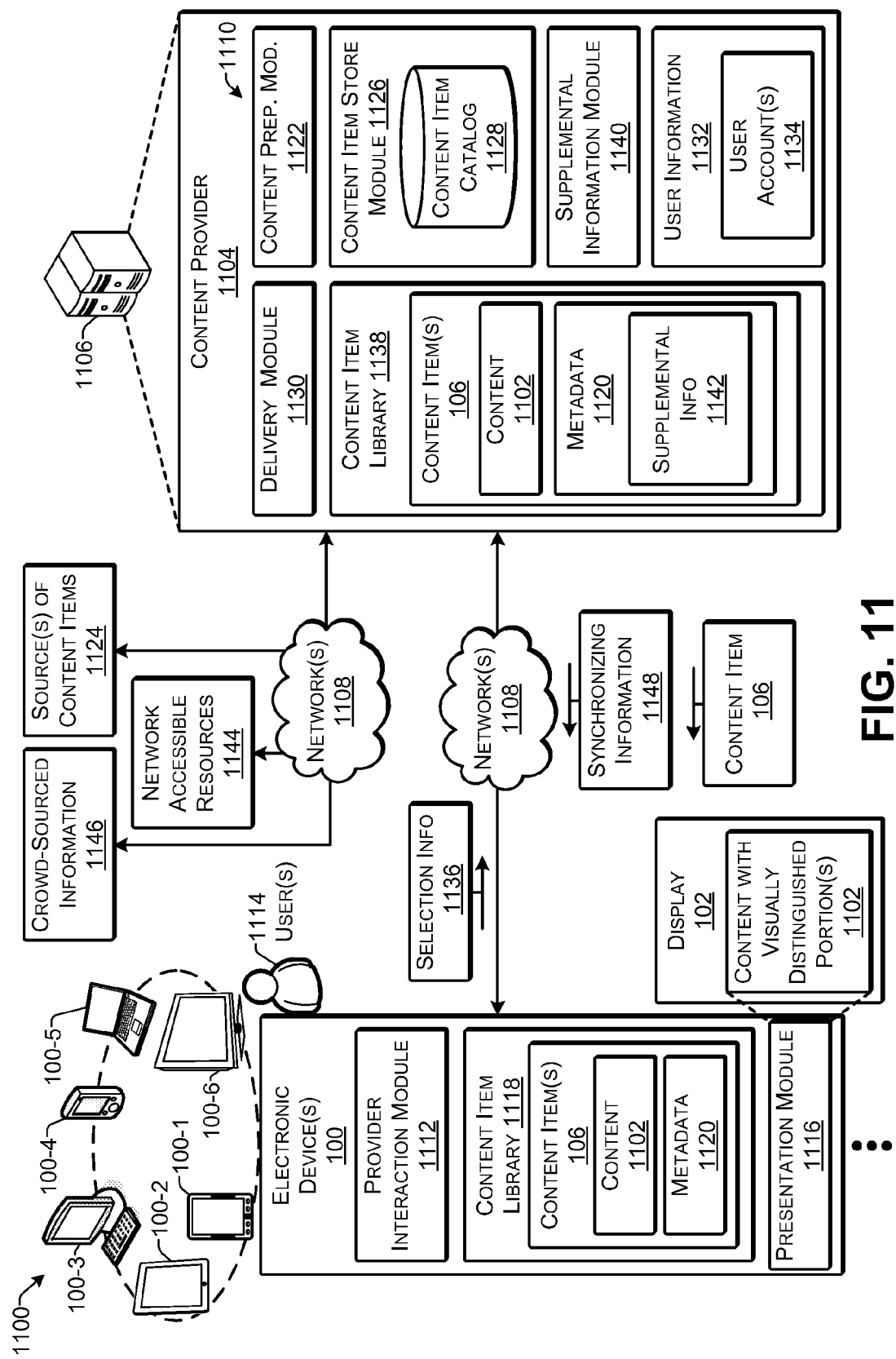
FIG. 11 illustrates an example system architecture for providing a content item and supplemental information according to some implementations.

FIG. 11 illustrates an example architecture of a system 1100 to provide content items and to enable visually distinguishing one or more portions of content of a content item according to some implementations. In some examples, an instance of a content item 106 including content 1102 with a visually distinguished portion may be presented by one or more electronic devices 100 capable of displaying, rendering or otherwise presenting the content item 106, such as on an associated display 102. Some examples of the electronic device(s) 100 may include digital media devices and eBook readers 100-1; tablet computing devices 100-2; desktop, terminal and workstation computing devices 100-3; smart phones and mobile devices 100-4; laptop and netbook computing devices 100-5; televisions, gaming systems, and home and automotive electronic devices 100-6; and any other device capable of accessing and rendering or playing content items, online content, mobile content, textual content, multimedia content, or the like.

In the illustrated example, the electronic device 100 is able to communicate with a content provider 1104. For instance, the electronic device 100 may communicate with one or more computing devices 1106 of the content provider 1104, to access or receive at least one content item 106 over one or more networks 1108. For example, the network(s) 1108 may include a local area network (LAN), a wide area network (WAN), such as the Internet, or any combination thereof, and may include both wired and wireless communication technologies using any suitable protocols and communication techniques. The computing device 1106 of the content provider and the electronic device 100 may communicate and interact with one another using any combination of suitable communication and networking protocols, such as Internet protocol (IP), transmission control protocol (TCP), hypertext transfer protocol (HTTP), and so forth. In some cases, the electronic device 100 may download one or more content items 106, while in other cases the content items 106 may be streamed to the electronic device 100.

The content provider 1104 may maintain an online location or site 1110, such as a merchant website, an e-commerce site, or other functionality that offers one or more content items 106 to the public. For example, the content provider site 1110 may be hosted on one or more of the computing devices 1106. In some cases, the host computing devices 1106 may be one or more web servers located at a data center, server farm, or other single physical location. In other cases, the content provider site 1110 or portions thereof may be located in diverse locations that are physically remote from one another. Further, in some implementations, the content provider site 1110 may be a group of websites, data stores, services, and the like, hosted on a plurality of different host computing devices 1106 in a plurality of diverse locations, or hosted by one or more host computing devices 1106 at a single location.

In some implementations, the content provider site 1110 may offer content items 106 to the public through an online presence accessible by a web browser or other application. In some examples, the content provider site 1110 alternatively, or additionally, may provide content items 106 through an online or mobile application executing on the electronic device 100. For example, an application on the electronic device 100 may connect to or obtain content from the content provider site 1110 to enable the purchase or management of one or more content items 106, and the like. Thus, the content provider site 1110 may enable the electronic device 100 to access content items 106 through an online or mobile application executing on a mobile device as the electronic device 100, such as an eBook reader, smart phone, tablet computing device, augmented reality device, or the like. Accordingly, the content provider site 1110 is not limited to a website accessed by a browser, but may encompass other technologies for marketing and providing content items 106, such as through in-application shopping, and the like.

The electronic device 100 may include a provider interaction module 1112, which in some instances may be an application, such as a web browser, mobile application, or other module or computer program configured to receive web content, webviews, online content, or the like, for accessing and interacting with one or more modules of the content provider 1104. For example, the provider interaction module 1112 may enable a user 1114 to shop for content items at the content provider site 1110 and access or receive content items 106 from the content provider site 1110, such as by downloading through the network 1108. Further, in some implementations, the provider interaction module 1112 may enable the user 1114 to organize or manage the content items 106 on the electronic device 100, while in other implementations a separate management module (not shown) may provide this functionality.

The electronic device 100 may include a content item presentation module 1116 and a content item library 1118 that may include at least one content item 106. In some implementations, the presentation module 1116 and the provider interaction module 1112 may be separate modules or applications. In other implementations, the presentation module 1116 and the provider interaction module 1112 may both be part of the same application or computer program for accessing and presenting content on the electronic device 100. In yet other implementations, the presentation module 1116 and the provider interaction module 1112 may represent different functionalities of the same module.

As one example, the presentation module 1116 may present content 1102 of a content item 106 on the display 102. In some examples, the display 102 may be part of the electronic device 100, and/or unitary with the electronic device 100. In other examples, the display 102 may be separate from the electronic device 100 and connected to or coupled with the electronic device 100. In any case, the presentation module 1116 may render content 1102 of one or more of the content items 106 on the display 102 for viewing by the user 1114. The presentation module 1116 may further display content 1102 having one or more enhanced portions that are visually distinguished from other portions. For example, the content 1102 of the content item 106 may be contained in at least one content file. Thus, the presentation module 1116 may control which portions of the content 1102 are presented as part of the content 1102, or hidden from presentation, when the content 1102 in the content item 106 is presented on the display 102. The presentation module 1116 may also control the visual effects and graphics schemes used to present one or more portions of the content item 106.

Further, in some examples, the content item 106 may include metadata 1120 that is associated with the particular instance of the content item 106, such as in one or more metadata files. In some examples, the metadata 1120 may contain data or information related one or more categories of the content 1102 that are able to be selected to be visually distinguished, while in other examples, a file containing the content 1102 may include the information on which categories of the content item may be visually distinguished. In some examples, the metadata 1120 may be contained in a separate file from the content 1102, while in other examples, the metadata 1120 may be combined with the content 1102 into a single file. In other examples, the presentation module 1116 may determine, based on input received from a user 1114, categories of the content item and the location of a corresponding content portion to visually distinguish while rendering the content on the display 102.

The presentation module 1116 may present one or more interfaces for selecting categories of the content to visually distinguish. Thus, the presentation module 1116 may generate and display the interfaces 300, 400, 500, 900 described herein to enable selection of categories and terms of the content item 106 to be visually distinguished. In some examples, the interfaces 300, 400, 500, 900 and/or graphic schemes (e.g., lines 114, 116, 206, 210, background patterns, and the like) for visually distinguishing portions of content may be overlaid on the content 1102 by the presentation module 1116 at a designated location. For instance, in some cases, the interfaces 300, 400, 500, 900 and/or graphic schemes may be generated using any of HTML (hypertext markup language), JavaScript®, CSS (Cascading Style Sheets), widgets, or any combination thereof, or any other suitable technology. For instance, as defined by the World Wide Web Consortium (W3C), a widget is an interactive single purpose application for displaying and/or updating local data or data from the Web, which may be packaged in a way to allow a single download and installation on a user's computing device, a mobile device, or the like. A widget may run as a stand-alone application, i.e., is able to run outside of a web browser, and the runtime environment in which a widget is run may be referred to as a widget user agent. A widget user agent may be specifically enabled for running widgets, or a more generic user agent (e.g., a web browser or other application) may run a widget. See, e.g., W3C.org, Working Group Note 27 Sep. 2011 for additional description of widgets. The W3C is an international community that develops open standards for use on the World Wide Web.

In addition, graphic effects such as colored text, colored or patterned backgrounds, highlighting, bolding, underlining, italicizing, outlining or other graphic effects, may be generated using any suitable coding techniques, such as HTML, JavaScript®, CSS, and various other text and graphics rendering software. Further, widgets, HTML, JavaScript®, and CSS are just several examples of technologies for displaying the interfaces and graphic effects described herein, and numerous other possible techniques, tools, functionalities, programming technologies, and the like will be apparent to those of skill in the art in light of the disclosure herein.

In some implementations, each content item 106 may include content 1102, such as text, images, audio, video, or the like, and may further include the metadata 1120 that is associated with the content item content 1102. For example, the content provider 1104, the author, the publisher, etc., may provide or may generate at least a portion of the metadata 1120 for a corresponding content item 106. As mentioned above, each instance of a content item 106 may be made up of any number of files or may be a single file. In some examples, the content provider 1104 may generate the metadata 1120 for a respective content item 106 to provide information related to the content 1102 of the content item 106. For instance, the content provider 1104 may include a content item preparation module 1122 that may receive a raw content item from one or more sources 1124 of content items. The sources 1124 of content items may be publishers, authors, movie distributors, studios, music companies, artists, and so forth.

In the case of textual content items 106, the content item preparation module 1122 may parse and process the text of the raw content item to produce the content 1102 that is compatible with various display formats, device platforms, and so forth. The content item preparation module 1122 may further parse and analyze a raw content item to produce at least a portion of the metadata 1120 that corresponds to the content item 106. For example, the metadata 1120 may include a variety of information, such as a language in which the content is written and location information that identifies location of portions of content within the content item. In some examples, the metadata 1120 may further identify the parts of speech contained in the content and the location of each part of speech contained in the content, location of each word, location of each character, or the like. For example, the content provider 1104 may parse the content 1102 into parts of speech, identify each part of speech, and associate a location in the content item with each part of speech. The metadata 1120 or the content 1102 may further include information that identifies the locations of individual sentences, paragraphs, chapters, and so forth in the content item. In some cases, the location information included with the metadata 1120 or the content 1102 may be used, at least in part, to enable identification of portions of the content 1102 to be visually distinguished. For example, the location of a word, sentence, chapter, and so forth, may be identified by referring to the location information. Thus, during presentation of the content item 106, the presentation module may use the location information, at least in part, to determine which portions of the content item not to present. Techniques for generating the location information are discussed additionally below.

The content provider site 1110 may include a content item store module 1126 that may provide or may access a content item catalog 1128. For example, the content item store module 1126 may present the content item catalog 1128 to the provider interaction module 1112 of an electronic device 100 that accesses the content provider site 1110 to shop for a content item 106. The content item catalog 1128 may include searchable and/or browsable listings and descriptions of content items 106 available from the content provider site 1110. The content item store module 1126 may communicate with the provider interaction module 1112 on the electronic device 100 to enable the user 1114 to locate and acquire a content item 106 from the content provider site 1110.

The content provider site 1110 may further include a delivery module 1130 that may deliver (or make available for delivery) a content item 106 to the electronic device 100 and/or the user 1114. For example, in some instances, the delivery module 1130 may facilitate the download of a content item 106 to the electronic device 100 over the network(s) 1108. In other instances, the delivery module 1130 may provide for delivery of a hard copy of a content item 106 to the user 1114, such as by delivery of a storage medium that maintains a copy of the content item, depending on the nature of the content item and the electronic device 100.

Furthermore, in some implementations, the delivery module 1130 may refer to user information 1132 to determine one or more content items 106 to download to the electronic device 100. For example, the user information 1132 may include account information 1134, such as user contact information, a purchase history, a user content item library, information on various devices 100 associated with a particular user account, or other records of content items purchased by the user 1114, as well as other transactions of the content provider 1104 with the user 1114. Accordingly, in some cases, the delivery module 1130 may assist in synchronizing the content of multiple devices 100 of a user or a user account, such as for delivering and synchronizing multiple instances of a content item 106 on multiple devices 100 associated with a single account.

Further, the user information 1132 may include user account information for a plurality of users 1114 of the content provider site 1110. For example, the user information 1132 may include a user account 1134 for each user for identifying and interacting with the user, such as name, email address, mailing address, telephone number, user identification (ID) number, user purchase history (e.g., content items 106 acquired by the user), usage and interaction information, and so forth.

In some examples, the electronic device 100 may send selection information 1136 to the content provider 1104 for inclusion with other information in the user's account 1134. For instance, the selection information 1136 may include information indicating which portions of content have been selected by a user to be visually distinguished, and the graphics schemes selected, for each content item 106 accessed by the user 1114. In some examples, the selection information 1136 of a plurality of different users associated with different user accounts may be collected and aggregated to determine which portions of content are popularly or most frequently visually distinguished or hidden. This information may then be used for various purposes, such as for suggesting to subsequent users portions of the content item to visually distinguish, identifying portions of the content item that are of particular interest to multiple users, and so forth. Further, the selection information 1136 for a particular user account may be used to synchronize the visually distinguished content with other instances of a particular content item on other devices 100 associated with the particular user's account.

The content provider site 1110 may also include or may access a content item library 1138. For example, the content item library 1138 may include a plurality of content items 106 that the content provider 1104 has available for access by electronic devices 100, such as by purchase through the content items catalog 1128. Each content item 106 in the content item library 1138 may include both content 1102 and metadata 1120 corresponding to the content. In some examples, the content item library 1138 may contain hundreds of thousands of unique content items 106, including a variety of eBooks, such as fiction, non-fiction, and so forth.

Further, in some implementations, a content item 106 to be delivered may be provided to a third party, such as a wireless provider that sends the content item 106 to the electronic device 100. Accordingly, an intermediary, such as a wireless network provider (not shown), or the like, may make the content item 106 available for delivery to a particular electronic device 100, or may otherwise provide the content item to the particular electronic device 100, and may further provide for synchronization of metadata, such as the selection information 1136, to other devices 100 of a user. For purposes of this disclosure, "providing" or "making available" by the content provider may include any intermediaries that perform delivery of the content items and/or selection information related to the content items, such as metadata 1120.

The content provider site 1110 may also include various other site components as is known, depending on the design and intended use of the content provider site 1110. Such other site components may include one or more pages of content, such as webpages, webviews, or other online content, that may be presented to the user 1114 through the provider interaction module 1112, such as during shopping for content items 106 from the content provider site 1110.

The content provider site 1110 may further include a supplemental information module 1140 that may be employed in some implementations for generating and managing supplemental information 1142 that may be used to identify various categories of a content item that may be visually distinguished. In some examples, when the user 1114 of the electronic device 100 accesses, purchases or otherwise obtains a particular content item 106, such as through interaction with the content provider 1104, the content provider 1104 may make the particular content item 106, including the corresponding content 1102 and metadata 1120, available for delivery to the electronic device 100. In some cases, the supplemental information 1142 is included in the same file as the content 1102, while in other cases, the supplemental information 1142 may be maintained in metadata 1120 corresponding to the particular content item 106, which may be a separate file from the content 1102.

The supplemental information module 1140 may operate on the content items 106 in the content item library 1138 to produce the supplemental information 1142. For example, the supplemental information module 1140 may select a particular content item 106 from the content item library 1138 for generating supplemental information 1142 for the particular content item 106. The supplemental information module 1140 may parse and index the content item 106 by identifying characters, people, things, phrases, places, topics, organizations, themes, and so forth, which are of significance in the content item. In some examples, the supplemental information module 1140 may access various authoritative sources of information, as well as performing statistical analysis and modeling to identify the significant entities, terms, objects, or other categories in the particular content item 106. Thus, during the parsing, the supplemental information module 1140 may identify candidate categories that are candidates to make into selectable categories for the content item. The supplemental information module 1140 may identify proper names, place names, statistically improbable phrases, and the like, in the text of the content item. For instance, a statistically improbable phrase is a word or combination of words that occur in the text of a content item one or more times in a manner that is outside of a predetermined threshold. For example, if a particular phrase is used multiple times in a content item, while not being used or being used rarely in other content items in a corpus of content items, this may be a statistically improbable phrase that is a candidate to become part of a selectable category of the content item.

To determine which candidate categories, attributes, and terms to make into selectable categories, attributes and terms, the supplemental information module 1140 may access external sources of information outside the content item. For example, the supplemental information module 1140 may access network accessible resources 1144 that may include online sources of information, such as Wikipedia®, Shelfari® and IMDb®, online dictionaries, online encyclopedias, wikis, online reference sites, discussion forums, or other online resources, to determine identification of characters and other significant phrases, things, events, or places in a content item 106. Further, the supplemental information module 1140 may obtain additional information on the statistically improbable phrases in the particular content item 106, such as by obtaining definitions or other information for these phrases from various locations, such as the authoritative sources mentioned above.

Furthermore, in some examples, the supplemental information module 1140 may utilize or may access crowd-sourced information 1146 for further identifying categories or terms of a content item to make into selectable categories or terms that may be visually distinguished in the text of the content item. For example, websites such as Shelfari® may allow users to add crowd-sourced information related to characters, places, topics, etc., in a content item. Further, crowd-sourced information 1146 may also include information received from users 1114 of electronic devices 100 to correct errors in portions of a content item that are visually distinguished in response to a selection of an category or term. Users 1114 may also assist in identifying alternate names for characters, identifying topics, identifying text related to themes, relationships, events, and interactions, and so forth. Additional details of generating the supplemental information 1142 are described below.

The supplemental information 1142 generated for each content item may be stored in the metadata 1120 for the particular content item 106, or other suitable location. When the user 1114 acquires a particular content item 106, such as through interaction with the content item store module 1126, the delivery module 1130 may deliver the particular content item 106 to the electronic device 100, and may also deliver the corresponding supplemental information 1142 for the particular content item, such as with the metadata 1120. For example, the particular content item 106 including the corresponding supplemental information 1142 and metadata 1120 may be downloaded contemporaneously from the content item provider site 1110, e.g., as a package or as a sequential download.

In some examples, the user 1114 may select and visually distinguish a portion of the content 1102 after obtaining a particular instance of a content item 106. For example, the user 1114 may decide to visually distinguish or hide one or more particular portions of the content 1102. In some cases, the selection information 1136 is sent from the user's device 100 to the content provider site 1110. The selection information 1136 may be indicative of which portions of the content item 106 have been selected to be visually distinguished and in what manner, graphic scheme, etc. The selection information 1136 may include, e.g., location information indicating a location in the content item of one or more portions of text that have been selected to be visually distinguished or hidden, or may otherwise identify the one or more selected portions of content. The delivery module 1130 may receive the selection information 1136 and add the selection information 1136 obtained from the particular user to the user information 1132, such as to a user's account 1134 associated with the particular electronic device 100 from which the selection information 1136 was received.

In some cases, the selection information 1136 received from the user device 100 may then be synchronized by the delivery module 1130 with other devices 100 associated with the particular user. For example, the delivery module 1130 may make available for delivery at least synchronizing information 1148 that may be delivered to the user device(s) 100 associated with the particular user, so that when the particular user accesses another instance of the same content item 106 on a different user device 100 associated with the user 1114, the one or more portions of content are visually distinguished in the same manner as on the first user device 100. The synchronizing information 1148 may be received by the other electronic device(s) 100 of the particular user, and may be employed the next time that the user accesses the particular content item 106 on the other electronic device(s) 100. Accordingly, one or more portions of content visually distinguished by a user using any of a plurality the electronic devices 100 associated with a particular user account, user login ID, or a particular content item library may be propagated automatically across the plurality of electronic devices 100.

Additionally, in some examples, the user 1114 may have the option to specify whether content visually distinguished on a first the electronic device 100 is also visually distinguished on one or more other electronic devices 100 associated with that user. For example, the user 1114 may specify that content visually distinguished on the first electronic device 100 is also visually distinguished on the other electronic devices 100 when the user 1114 accesses other instances of the same content item 106 on those devices. As another example, the user 1114 may specify that content visually distinguished on the first electronic device 100 is visually distinguished on a second electronic device 100 of the user, but not visually distinguished on a third electronic device 100 of the user. The user may have the option to set preferences for each electronic device 100, which may control whether visually distinguished content information from other devices 100 is synchronized to a particular device 100. Alternatively, when accessing each particular content item 106 on one of the other electronic devices 100, the user 1114 may be presented with pop-up menu or the like that provide the user with the option of whether or not to incorporate the synchronizing information 1148 for the particular instance of the content item 106. Numerous other variations will be apparent to those of skill in the art having the benefit of the disclosure herein.

Furthermore, in the case that multiple users share an electronic device 100, a user account 1134, a content item library 1118, or the like, and thereby share access to a particular content item 106, the content provider 1104 may enable the multiple users to set preferences as to whether portions of content visually distinguished by a first user are also visually distinguished to a second user associated with the same user device, user account, or content item library. Accordingly, content selected to be visually distinguished by the first user may be visually distinguished to the second user in some examples.

In some cases, a category or term selected to be visually distinguished in a first content item may be persisted across multiple content items based on the selection information 1136. For example, suppose that the user selects a particular topic, e.g., "supply-side economics," and further specifies that text related to this term be visually distinguished in any other content items that the user subsequently accesses. The content presentation module 1116 may maintain a record of categories and terms selected by a user to be persisted across multiple content items 106 with the selection information 1136. Thus, when the user opens a particular content item 106 on the electronic device 100, the content presentation module 1116 may compare the persisted categories or terms with the categories and terms available to be selected in the particular content item 106 to determine whether there is a match. As one example, the content presentation module 1116 may refer to the supplemental information 1142 included in the metadata 1120 for the new content item to determine if the new content item includes the term "supply-side economics," or an alternate name thereof. When a match is located, the content presentation module may automatically visually distinguish corresponding text in the particular content item based on the persisted category or term.

Additionally, the supplemental information module 1140 may aggregate the selection information 1136 collected from a plurality of users and a plurality of devices 100 associated with different user accounts. The supplemental information module 1140 may determine which portions of a particular content item are visually distinguished frequently, and may inform users of this information. For example, when a user first opens a newly acquired content item, the user may be presented with a message that other users popularly visually distinguish one or more places, characters, topics, etc., in this content item. The message may also include a selectable button or control to enable the user to easily turn on the popular visually distinguishing categories. Numerous other variations will be apparent to those of skill in the art in light of the disclosure herein.

Example Framework for Generating Supplemental Information

Figure 12:
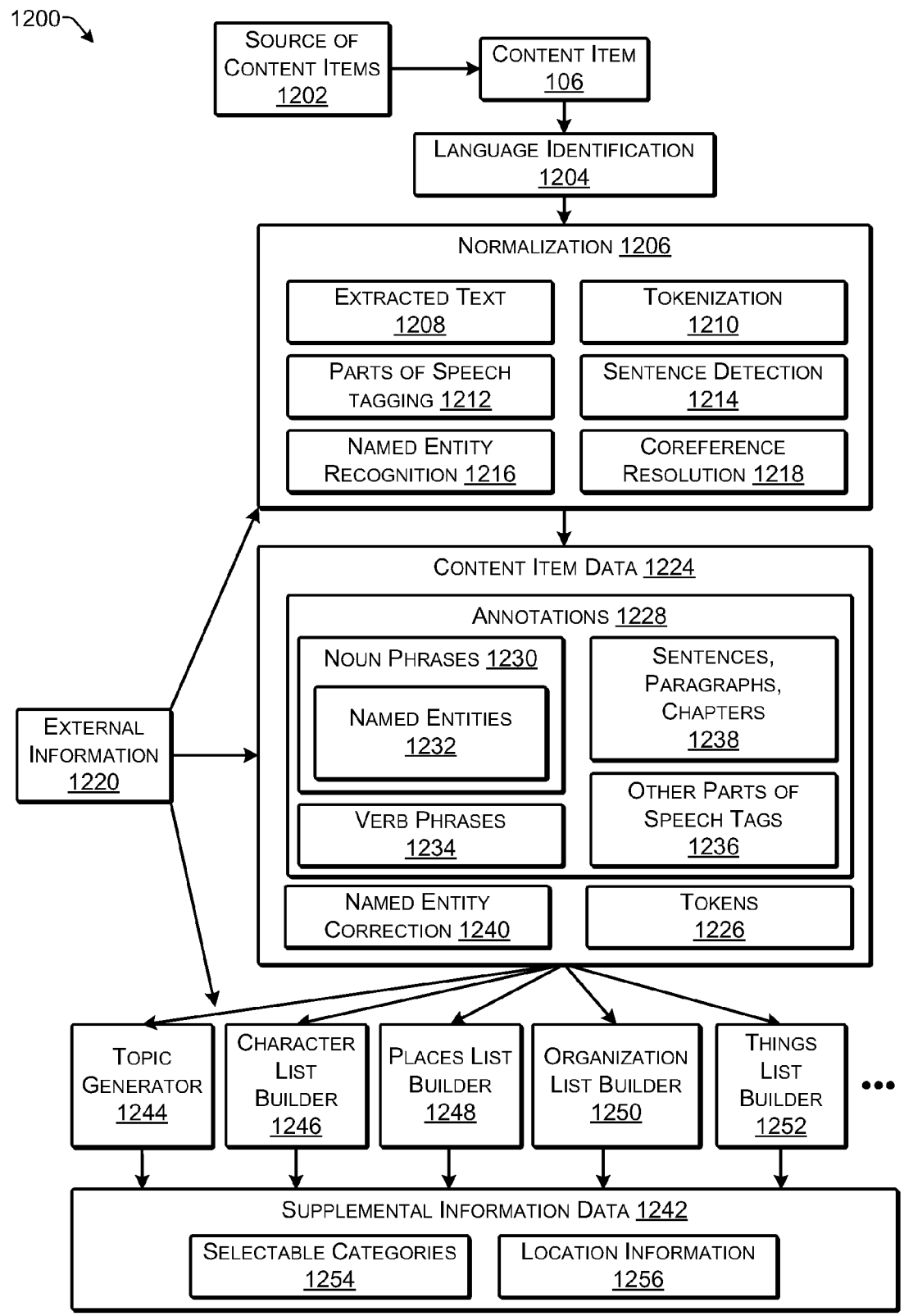
FIG. 12 illustrates an example framework for identifying terms corresponding to topics, characters, places, organizations, things, and other categories of a content item according to some implementations.

FIG. 12 illustrates an example framework 1200 that may be employed by the supplemental information module 1140 of the content provider 1104 for generating supplemental information data according to some implementations. In this example, the content provider 1104 may receive a content item 106 from a source 1202 of content items, such as from a publisher, an author, a content item library, or other source of content items. The content item 106 may optionally undergo language identification, as indicated at 1204 to identify the language in which the text associated with the content item 106 is written. Further, since content items may be stored in a variety of different formats, the text of the content item 106 may be normalized, as indicated at 1206, by extracting the raw text from the content item 106 to obtain extracted text 1208. The normalization 1206 may include tokenization 1210 of the extracted text 1208 of the content item 106. As discussed additionally below with respect to FIG. 13, tokenization 1210 may include parsing the text of the content item into tokens that may include individual words, punctuation marks, symbols, etc., contained in the text of the content item 106, and associating location information with each token identified in the content item 106. Thus, each word or punctuation mark in the text of the content item 106 may be assigned a unique location sequence or value, such as based on an offset of the token from the beginning of the content item and a number of characters in the token, which may be referred to as the length of the token.

Furthermore, normalization 1206 may include, or may be followed by, parts of speech tagging 1212 and sentence detection 1214. Parts of speech tagging 1212 may include identification of parts of speech in the text of the content item 106, such as noun phrases, verb phrases, and various other parts of speech that may be of interest for identifying the categories of the content item discussed above. Thus, each token may be associated with at least one part of speech. In addition, sentence detection 1214 may include identifying sentences, paragraphs, and chapters contained in the content item 106. In some examples, as discussed additionally below with respect to FIG. 13, the parts of speech, the identified sentences, and so forth, may have location information associated therewith that includes a start identifier, a length, and a type. For instance, a length of a sentence or a part of speech may refer to the number of tokens in the sentence or the part of speech, while the start identifier may be identified using the first token in the sentence or part of speech. Furthermore, in some examples, the parts of speech tagging may be performed incrementally one sentence at a time.

Additionally, normalization 1206 may include, or may be followed by, named entity recognition 1216 and coreference resolution 1218. For example, named entity recognition 1216 may include recognizing entities in the content item, such as names of people, places, organizations, topics, certain numerical expressions, quantities, and so forth. For instance, proper nouns, such as names of people, places, organizations, and the like, may be identified based on various lists of names, or other techniques for detecting and distinguishing these separate types of entities. Furthermore, in some cases, external information 1220, that is external to the content item 106, may be employed to assist in named entity recognition, such as by referring to the network accessible resources 1144 and/or crowd-sourced information 1146 discussed above with respect to FIG. 11, or other suitable resources such as files or databases of names, nicknames, places, organizations, etc. In addition, coreference resolution 1218 may involve identifying occurrences in the content item 106 in which multiple different expressions or pronouns refer to the same thing in the content item 106.

The normalization 1206, including the operations described above, results in content item data 1224 that may include tokens 1226 and annotations 1228. The annotations 1228 may include noun phrases 1230, which may include for example, proper nouns for some named entities 1232, such as people/characters, places, organizations, as well as other nouns and noun phrases identified in the content item 106 for topics and the like. The annotations 1228 may further include verb phrases 1234 and other parts of speech tags 1236 identified in the content item 106. The annotations 1228 may further include information on sentences, paragraphs and chapters 1238 identified in the content item 106.

Additionally, in some instances, named entity correction 1240 may be performed for named entities 1232 identified in the content item data 1224. As one example, an employee of the content provider 1104 may check the named entities 1232 in the content item 106 for accuracy. As another example, external information 1220 may be applied for checking the named entities 1232 in the content item data 1224. For example, the named entities 1232 for the content item 106 may be posted to a source of crowd-sourced information 1144, which may be relied on for correcting any errors in the named entities 1232 for the content item 106. Thus, the named entities 1232 may be posted to a community website, such as Shelfari®, that includes a page or entry for the content item 106, and visitors to the community website may provide information to correct any errors in the named entities 1232, selected categories, or the like. As another example, users electronic devices 100 who receive the supplemental information 1142 with a content item may note an error in the supplemental information and may provide the external information 1220 used for named entity correction 1240. Accordingly, crowd-sourced information and crowd-sourced corrections may be used in some cases to perform named entity correction 1240.

The content item data 1224 may be used to generate supplemental information data 1242, which may include a variety of supplemental information that may be used to identify the location in the text of a content item of various categories to be visually distinguished. For example, a topic generator 1244 may employ external information 1220 to generate one or more topics from the content item 106. For example, the topic generator 1244 may generate a set of useful topics based on a detection of what the content item 106 is generally related to and, by extension, where to find more information about the identified topics, such as in the current content item or other content items. For example, the topic generator 1244 may access Wikipedia® or other network accessible resources 1144 to determine which of the noun phrases 1230 or other terms identified in the content item 106 correspond to entries in Wikipedia® or other network accessible resources 1144. Some examples assign ranks to candidate topics based in part on an analysis of links to the entry associated with each candidate topic. Any of various link analysis ranking techniques may be applied, such as the PageRank® algorithm, or other suitable link analysis algorithms and techniques for assigning a link-based rank to each topic. Thus, the links to a particular entry corresponding to a particular topic from other entries corresponding to other topics may be considered during ranking of the candidate topics.

Additionally, the contribution of a particular candidate topic to other candidate topics in the content item 106 may also be considered. This may be determined by calculating a contribution based on an analysis of links from an entry of a candidate topic to the other entries corresponding to the other candidate topics. A link analysis algorithm may also be adapted for making this determination. Thus, the candidate topics may be ranked based on the values of incoming and outgoing links of corresponding entries in the network resources, and those candidate topics having a rank below a certain ranking threshold may be pruned or otherwise removed from consideration. Further, other techniques may also be used to rank the connectedness of candidate topics. As one example, the ranking of the candidate topics may be based merely on the number of incoming and outgoing links for each candidate topic entry. Other variations will also be apparent to those of skill in the art in view of the disclosure herein.

In addition, in some examples, a term frequency-inverse document frequency (tf-idf) value may be calculated for each candidate topic to further refine the number candidate topics for a content item. For example, a very large corpus of textual works (e.g., thousands or hundreds of thousands of textual works) may be parsed into n-grams, e.g., one-word n-grams, two-word n-grams, three-word n-grams, four-word n-grams, and five-word n-grams. The frequency of occurrence of each n-gram in the corpus may be determined and normalized based on inverse document frequency. The frequency of the candidate phrases in the instant content item may then be compared with the frequency of those candidate phrases in the works of the overall corpus using tf-idf values. Candidate phrases having a tf-idf value that differs from the tf-idf value for that phrase in the corpus by less than a certain tf-idf threshold may be removed from consideration since they are likely common phrases that do not bear much importance to the subject of the content item 106. The candidate topics that remain may be designated as the set of "topics" for the instant content item 106, and text of the content item associated with the set of topics may be identified based on location information, e.g., chapter start and end points (e.g., if a topic is associated with a chapter heading), section start and end points, paragraph start and end points, sentence start and end points, punctuation, and so forth. For example, if a particular topic, or a synonym or alternate name thereof, is mentioned in a paragraph, then the paragraph may be text that is visually distinguished when the particular topic is selected by a user. Numerous other variations will be apparent to those of skill in the art having the benefit of the disclosure herein.

In addition, a character list builder 1246 may build a list of characters from the named entities 1232 in the content item 106 that are identified as corresponding to people or characters. For example, the names corresponding to people in the content item 106 may be identified, such as through lists of common names, presence of titles and suffixes, lists of nicknames, and so forth. The person names in the list may be further sorted according to the fullness of name, i.e., whether both first name and last name is provided, whether just a first name or just a surname is provided, whether a prefix or suffix is provided, etc.

The names may subsequently be clustered into name sets, and the names in the name sets may further be disambiguated. For example, characters are often referred to by multiple different names in a content item. As one example, the expressions "the tin man," the "Tin Woodman," "the Woodman," and "Nick Chopper" are all used to refer the Tin Woodman character in L. Frank Baum's series of Oz books. Accordingly, the character list builder 1246 associates these various different expressions or alternate names with a single character. In some instances, external information 1220 may be employed by the character list builder 1246, such as by referring to the network accessible resources 1144 and/or crowd-sourced information 1146 discussed above, or other suitable resources, such as files or databases of names, nicknames, places, organizations, etc.

Additionally, each person or character name that is identified may be mapped to a set of annotations or occurrences in the content item. For example, the name "John" might be mapped to 100 annotations because the named "John" occurs 100 times in the content item. Furthermore, in some cases, a name may occur in two or more name sets because the content item may contain two or more characters with the same name or alias. For example, a content item that discusses both "Bill Clinton" and "Bill Cosby" might have the name "Bill" used by itself in the text of the content item. In such a case, various techniques may be used to determine which character or person a particular occurrence of the single "Bill" may refer to, such as by determining a distance from an annotation occurrence that includes both "Bill" and a last name.

The character list builder 1246 may use the clustered and disambiguated names to create characters for the content item including the locations of each occurrence of each character name in the content item. The character list builder 1246 may further determine which name to use as the representative or primary name for a particular character, such as based on a fullness or amount of information in the name.

Text of the content item to be associated with a particular character (e.g., in a fiction book) or person (e.g., in a non-fiction book) may be determined using various techniques. In some examples, any paragraph that includes the character name may be associated with the character. In other examples, only text containing dialogue or thoughts attributable to a character is associated with a character. For example, the content item may include quotation marks around words of dialogue that may be attributable to a particular character. For instance, the quoted portion may be preceded or followed by a reference to a particular character name (e.g., a name, alternate name, or pronoun indicating the character) and possibly a word or phrase indicating speech (e.g., "said," "remarked," "exclaimed," "replied"). In such instances, the quoted words may be identified and associated with the character. In other content items, such as in the case of a script or screenplay, a character name may simply be followed by punctuation, such as a colon, and then the words "spoken" by the character, with or without quotation marks. Further, quoted words may appear without a proximate character identity reference. For example, where two character identities exchange dialogue, the content item may include a character identity reference near only some quoted portions (e.g., at the beginning of the exchange). Implementations herein may assume that, where no contrary indication exists in the content item, the quoted portions alternate between the two characters. As another example, character names or pronouns that immediately precede or follow words such as "thought," "felt," "believed," and the like, may indicate the thoughts of a character, and sentences or paragraphs that include such combinations may also be associated with the character. Furthermore, words that do not appear to be associated with any character may be interpreted as being associated with a narrator of the content item 106.

A places list builder 1248, an organizations list builder 1250, a things list builder 1252, and various other category builders, such as an interactions list builder, events list builder, relationships list builder, phrases list builder, themes list builder, and so forth, (not shown in FIG. 12) may be employed to identify respective categories and corresponding terms in the content item. For example, the places list builder 1248 may identify and cluster places that are the same, but that are referred to by different or alternate names, such as by clustering "the English Channel" with "the Channel," in a manner similar to that described above with respect to the character list builder 1246. Similar to the examples described above for topics and characters, various techniques may be used for determining transition in the text between the places or settings at which the action takes place. For instance, the places builder may consider chapter breaks, paragraph breaks, whether the name of a place is used in text attributed to the narrator, as opposed to in dialogue attributed to a character, and so forth. For example, suppose that the text of a paragraph includes reference to Saint Paul's Cathedral, and a network accessible resource identifies Saint Paul's Cathedral as being located in London. Thus, there is a high likelihood that the paragraph is set in London, and the text of this paragraph may be associated with London and England, particularly if nearby paragraphs are also associated with London.

The organizations list builder 1250 may use similar techniques to identify organizations, such as corporations, groups, teams, institutions, associations, clubs, societies, and so forth, discussed in the content item. Further, the things list builder 1252 may identify things that are believed to be important to the particular content item. For example, such things of interest to a particular work may be identified for fiction works in a manner similar to topics identified for non-fiction works, as well as, or alternatively, from crowd-sourced information 1146. Other category builders may be included for various other types of term categories such as themes, scenes, events, interesting or popular phrases, citations, relationships between characters, interactions between characters, time periods, and so forth. Accordingly, the supplemental information data 1242 may include selectable categories 1254, which identify the selectable categories, attributes and terms in the content item, including any alternate names. The supplemental information data 1242 may further include location information 1256, which may include the location of each occurrence in the text of the content item of each selectable category or term, as well as a start location and end location of each portion of text associated with each selectable category or term.

Figure 13:
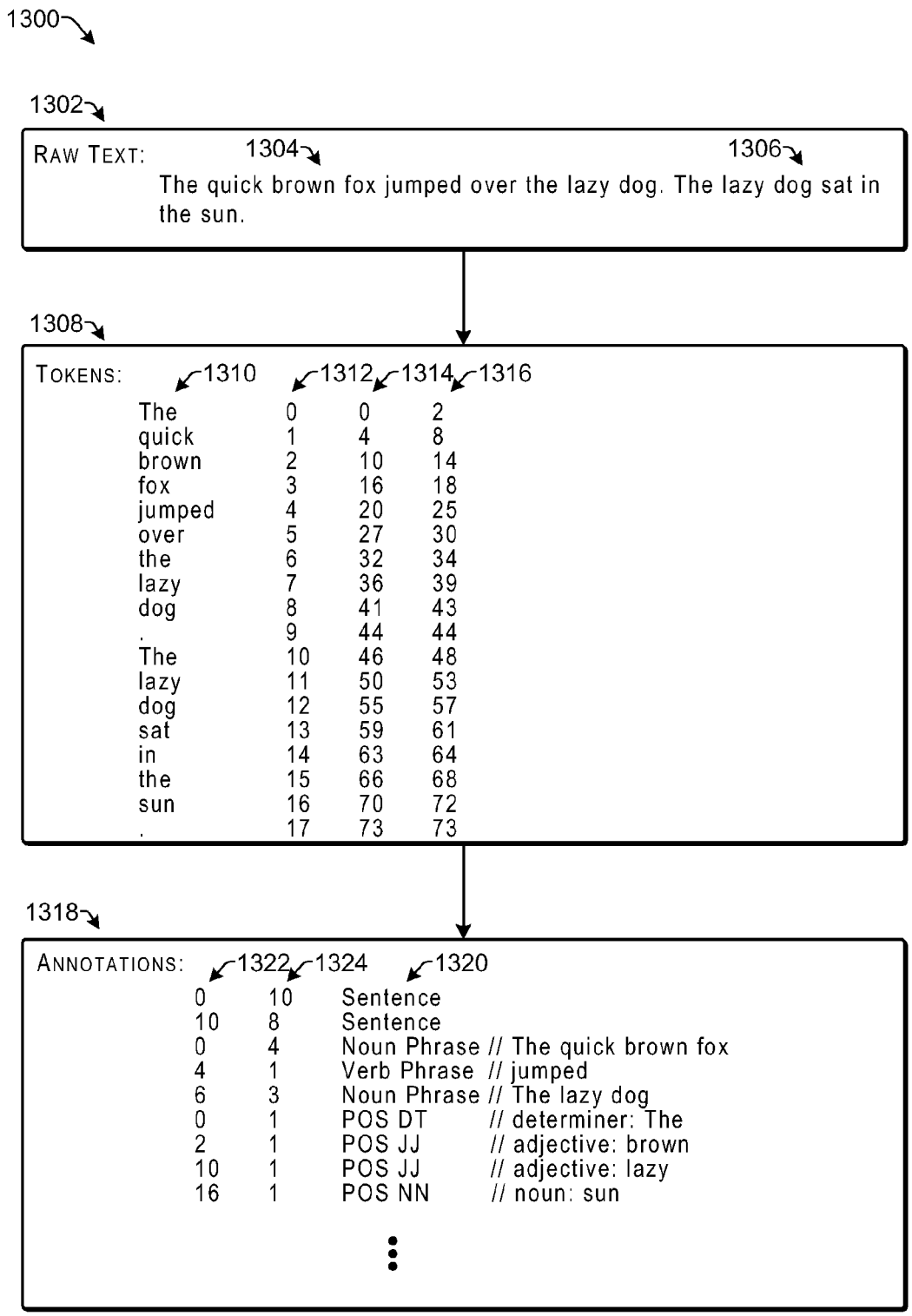
FIG. 13 illustrates an example framework for determining tokens and annotations from raw text of a content item according to some implementations.

FIG. 13 illustrates an example framework 1300 for determining text tokens and annotations from raw text 1302 according to some implementations. In this example, suppose that the content item has raw text 1302 that includes a first sentence 1304, "The quick brown fox jumped over the lazy dog," and a second sentence 1306, "The lazy dog sat in the sun." The raw text 1302 may be parsed or divided into token information 1308. For example, each word and punctuation mark in the text 1302 may be identified as a separate token 1310. Alternatively, in other examples, only words are identified as tokens and punctuation marks are treated as parts of adjacent words or as spaces.

Location information may be assigned to or associated with each token 1310 based on the number of characters, such as letters, numbers, spaces, or punctuation marks. The location information may include a sequentially assigned token number 1312, a start location or offset 1314 and an end location 1316. Thus, the word "The" may be the first token in the content item and, therefore, has a token number of "0" as the first token in the content item. Further, the start location of "The" is also "0," and the end location of "The" is "2" since there are three characters in "The". Next, "quick" is the second token in the content item and so has a token number of "1." Further, the start location of "quick" is "4" (counting the space between "The" and "quick"), and the end location of "quick" is "8" since there are five characters in "quick." Thus, the entire text of the content item may be divided into tokens in this manner and each token may be associated with unique location information that identifies the location of the token within the content item.

Furthermore, annotation information 1318 may be determined from the raw text 1302 and the token information 1308. For annotations, the location is determined based on numbering of tokens, rather than individual characters. For example, annotations 1320 may refer to sentences, paragraphs, chapters, or parts of speech, such as noun phrases, verb phrases, as well as other parts of speech such as determiners, adjectives, nouns, adverbs, pronouns, fonts, emphasis on a work, and so forth. Location information associated with each annotation 1320 may indicate a start location 1322 and a length 1324 of each annotation 1320 in terms of tokens. For example, the first sentence 1304 starts at start location "0" (i.e., the first token), and is "10" tokens in length. Similarly, the second sentence 1306 starts at location "10," and is "8" tokens in length. Thus, the annotation information 1318 may specify particular locations of annotations within the content item based at least in part on the locations of the tokens that are included in each annotation.

Additionally, or alternatively, the location of a token (and thereby the location of an annotation or term) may be identified or specified using other location identification techniques. For example, the location of each token may be identified according to the coordinates of each token on a page or within an image. Further, in some cases, a token may be an image or a portion of an image. Thus, the coordinates of the image or the portion of the image may be identified by a page number (or other location) on which the image appears and a set of x-y coordinates (i.e., in a plane of the displayed page) or other suitable coordinates.

Accordingly, in some cases, an image may be included in a content item, and the image may be associated with a character, topic, place, or other term category, such as by text associated with the image, image recognition techniques, or the like. Therefore, when a particular category, attribute or term is selected by a user to be visually distinguished, a relevant image may also be visually distinguished in addition to any text associated with the selected category, attribute or term. For example, if the user selects "London" as a place to be visually distinguished, and if content item contains a map of London, the map of London may be presented with a visually distinguishing graphic scheme similar to the visually distinguishing graphic scheme used in the content item for visually distinguishing the text corresponding to London. In some examples, the categories, attributes or terms may be associated with an image by an employee of the content provider 1104 or by a member of a community or crowd-sourced information website, such as Shelfari®. In other examples, the categories, attributes or terms of a content item may be associated with an image automatically using one or more image recognition algorithms that identify, for example, characters based on comparison with other available images of the characters, stock image collections, map collections, images of famous landmarks, and so forth. Furthermore, various other techniques for generating tokens and identifying the locations of tokens will also be apparent to those of skill in the art in light of the disclosure herein, with the foregoing being merely several non-limiting examples.

Example Structure

Figure 14:
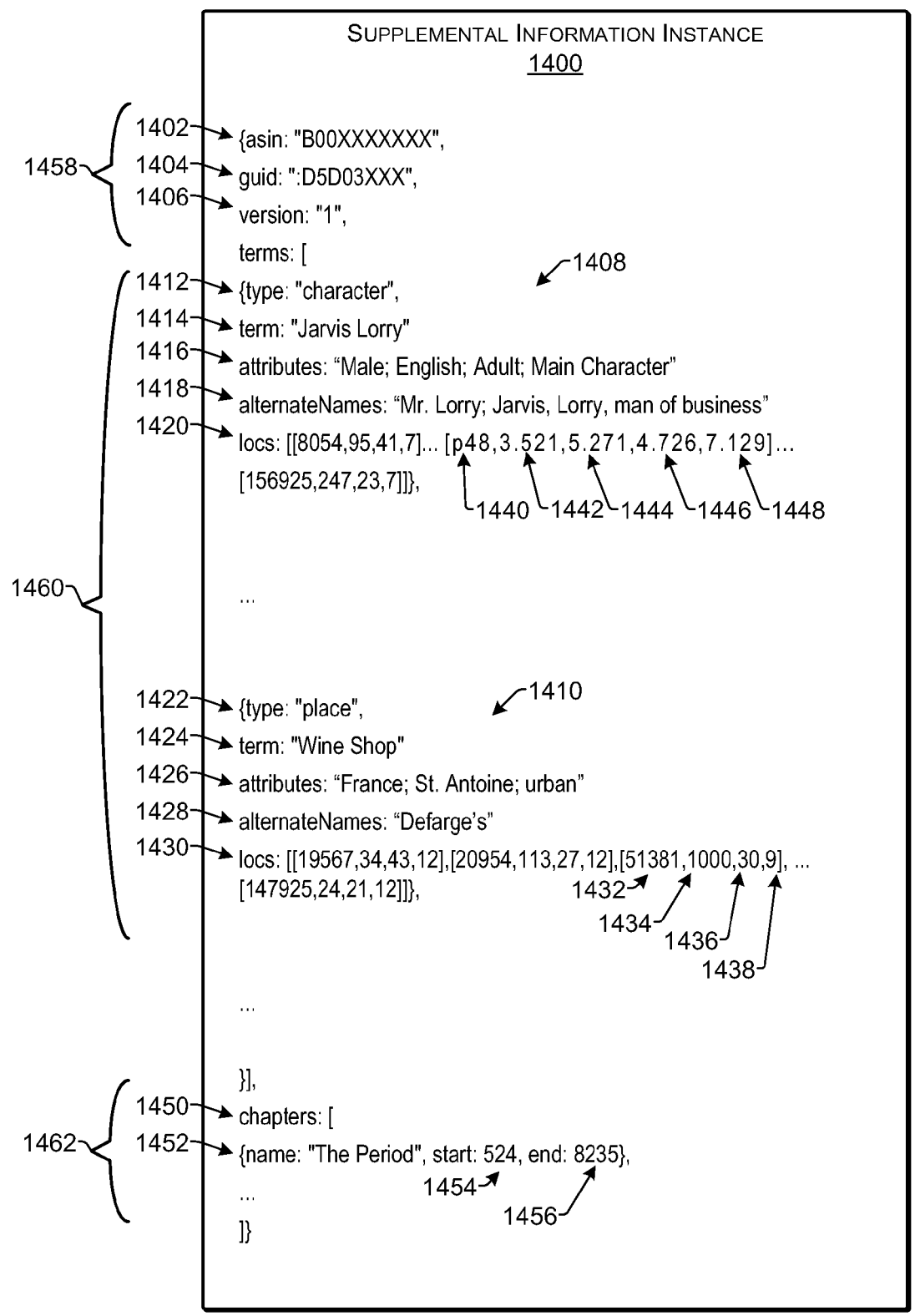
FIG. 14 illustrates an example structure of a supplemental information instance according to some implementations.

FIG. 14 illustrates an example structure of a supplemental information instance 1400, such as for a content item 106 discussed above, according to some implementations. In this example, the supplemental information instance 1400 is formatted according to the JSON (JavaScript Object Notation) standard; however, implementations herein are not limited to any particular standard, programming language, protocol, or the like.

The supplemental information instance 1400 includes an identifier 1402 that identifies the content item 106 to which the supplemental information instance 1400 corresponds. For example, the identifier 1402 may be any suitable identifier, such as an ASIN (Amazon Standard Identification Number), a 9-digit or 13-digit ISBN (International Standard Book Number), an ISSN (International Standard Serial Number), an LCCN (Library of Congress Control Number), or any other suitable identifier that can be used to correlate the supplemental information with the correct corresponding content item 106. For example, in some cases, the identifier 1402 may merely be the title of the content item, an arbitrarily assigned number, or the like. The supplemental information instance 1400 may further include other header information such as a GUID 1404, which may be a globally unique identifier for the file content of the content item; and a version 1406, which may indicate a format version of the supplemental information instance 1400.

The supplemental information instance 1400 may further include term information for one or more categories, attributes or terms in the content item 106. In the illustrated example, first term information 1408 is included for the character term "Jarvis Lorry," and second term information 1410 is included for the place term "Wine Shop," although term information for numerous other categories, including topics, things, organizations, themes, phrases, etc., as well as additional characters and places, may be similarly included in the supplemental information instance 1400. The first term information 1408 includes a category type 1412, which in this example is a "character," a term 1414, "Jarvis Lorry," which is the representative or primary name for the character, and attributes 1416. The attributes 1416 may include various attribute categories determined for this particular character term such as from the one or more network accessible resources 1144 and/or the crowd-sourced information 1146, as described above. In this example, attributes that apply to Jarvis Lorry may include that he is male, English, adult, and that he is a main character. The first term information 1408 may further include one or more alternate names 1418 determined for the character Jarvis Lorry. Examples of alternate names determined for this character using the techniques discussed above include "Mr. Lorry," "Jarvis," "Lorry," and "man of business."

The first term information 1408 may further include location information 1420 for this character. The location information 1420 may specify a location in the text of the content item 106 of each occurrence of the character name (i.e., either the primary name 1414 or an alternate name 1418) and/or a beginning location and end location of portion of text to be visually enhanced if the user selects Jarvis Lorry as a term to be visually distinguished in the text of the content item.

Similarly, the term information 1410 for "Wine Shop" includes a category type 1422, which in this example is a "place," a term 1424, "Wine Shop," which is the primary name for the place, and attributes 1426. In this example, the attributes for the Wine Shop include that the Wine Shop is located in France, in St. Antoine, and in an urban setting. Furthermore, the second term information 1410 may include alternate names 1428 for the Wine Shop, which in this example includes one alternate name "Defarge's."

The second term information 1410 may further include one or more locations 1430 that identify the location in the text of the content item 106 of one or more respective occurrences of the place and/or the beginning location and end location of portions of text to be visually distinguished if the "Wine Shop" is selected as a term to be visually distinguished. Further, while example term information 1408, 1410 for two types of categories has been illustrated in this example for discussion purposes, numerous other terms for these category types and for other types of categories, as enumerated above, may be included in the supplemental information instance 1400 and may be similarly formatted.

The location information 1420, 1430 provided for the terms Jarvis Lorry and the Wine Shop, respectively, may include, in each instance, four or more values that represent an excerpt or portion of text of the content item to be visually distinguished (or hidden, depending on the selection of the user). For example, suppose a portion of text goes from location 51381 to location 52381 and contains an occurrence of the term "Wine Shop" (or Defarge's) at locations 51411 to 51420, using a location information technique discussed above with respect to FIG. 13. This may be expressed using four discrete numbers or values to represent both the portion of text and the location of the term within the portion of text. The first value 1432 (i.e., "51381") in the location information 1430 represents the starting location of the portion of text in the content item as an offset from the beginning of the text of the content item, as discussed above with respect to the tokens of FIG. 13. Thus, in this example, the starting location is "51381" is indicated at 1432. In addition, the length of the portion of text is "1000" positions (e.g., each position may correspond to one alphanumeric character, space or punctuation mark), with the term "Wine Shop" starting 30 positions into the excerpt. Accordingly, the second value 1434 in the location information, which is "1000" in this example, indicates the length of the portion of text (or the number of positions in the excerpt). The third value 1436 indicates the starting location (30) of the occurrence of "Wine Shop" in the excerpt of text, and the fourth value 1438 indicates the length (9 positions or characters) of the term "Wine Shop" in the portion of text. Thus, the location numbering enables identification of the location of the portion of text in the content item to enable the portion of text to be visually distinguished (or hidden), and further identifies the location of the term "Wine Shop" within the portion of text, so that this term might be additionally visually distinguished, if desired. Thus, at least the first two values 1432 and 1434 may be used by the presentation module 1116 when determining a start location and an end location for visually distinguishing a portion of text. Further, when two occurrences of the term are contained in a single excerpt, then six numbers may be used to represent the locations of the two occurrences of the term within the single excerpt, with the last two values representing the start location and length of the second occurrence of the term in the excerpt.

In addition, it may be noted that the locations associated with each term in the supplemental information instance 1400 provide an index for locating other occurrences of a selected term. Thus, by grouping the location information of the occurrences of a term with one another in the manner described in FIG. 14, name merging of alternate names may be automatically provided for so that it is not necessary to refer to the separate listing of alternate names 1418 to visually distinguish portions of text that include the alternate names when the term is selected. In this example, suppose that the content item 106 contains separate occurrences of the names "Mr. Lorry," "Jarvis Lorry," and "man of business." These alternate names may be clustered and disambiguated by the character list builder 1246, as described above, to all relate to the single character "Jarvis Lorry." Accordingly, the locations of the different occurrences of "Mr. Lorry," "Jarvis Lorry" and "man of business" may be included in the locations 1420 for "Jarvis Lorry." Consequently, if a user selects the character term "Jarvis Lorry" to be visually distinguished, the location of all text associated with the term to be visually distinguished may be determined from the location information 1420, regardless of whether the occurrences are "Jarvis Lorry," "Mr. Lorry," or "man of business."Consequently, merging of alternate names is automatically achieved through the use of the location information 1420, 1430, thereby negating the need to have separate listings for "Jarvis Lorry," "Mr. Lorry," and "man of business."

In addition, as discussed above with respect to FIG. 13, in some cases, the location information for some or all of the terms may be based on a coordinate system, rather than, or in addition to, a text offset. In the example of FIG. 14, the location information 1420 for Jarvis Lorry includes both text offset location information (e.g., "[8054,95,41,7]," and "[156925,247,23,7]"), as well as coordinate system location information (e.g., "[p48,3.521,5.271.4.726,7.129]"). The coordinate system location information in this example includes a page number 1440, a first x-axis coordinate 1442, a first y-axis coordinate 1444, a second x-axis coordinate 1446, and a second y-axis coordinate 1448. Thus, the first x and y coordinates 1442, 1444 may identify a location of a first corner of a bounding box and the second x and y coordinates 1446, 1448 may represent a location of a second corner of a bounding box that encompasses a particular token. For example, the coordinate system location information in this example may describe the position of a rectangle that includes a portion of text or some or all of an image, as discussed above with respect to FIG. 13. As an alternative, the second two values 1446, 1448 may be a width and height of a bounding box having a corner located at the first two coordinates 1442, 1444. Still alternatively, in the case that a bounding circle is used, rather than a bounding box, the first two coordinates may be a location of a center of the circle and only one additional value may be used to specify a radius of the bounding circle. Numerous other variations will be apparent to those of skill in the art having the benefit of the disclosure herein.

In the supplemental information instance 1400 of FIG. 14, following the conclusion of the term or category information, the supplemental information instance 1400 may include chapter information for chapters 1450 of the content item 106. Thus, each chapter 1450 may be identified by the name 1452 of the chapter, i.e., "The Period" in this example, the start location 1454 of the chapter and the end location 1456 of the chapter. Accordingly, in the illustrated example, the supplemental information instance 1400 includes three sections, namely a header section 1458, a term or category information section 1460, and a chapters section 1462. Further, other types of supplemental information may be included in the supplemental information instance 1400 in addition to the examples described above. Accordingly, implementations herein are not limited to the particular example structure illustrated. Additional examples of structures, techniques and user interfaces for generating and providing supplemental information are described in U.S. patent application Ser. No. 13/433,028, filed Mar. 28, 2012, and Ser. No. 13/431,838, filed Mar. 27, 2012, the entire disclosures of which are incorporated herein by reference.

As mentioned above, the supplemental information instance 1400 may be accessed by the presentation module 1116 for visually distinguishing selected categories, attributes or terms of a corresponding content item 106 when the content item 106 is presented on the display 102 of the electronic device 100. For example, when the user uses the user interfaces 300, 400, 500, and/or 900 to select one or more categories, attributes or terms to visually distinguish, the presentation module 1116 may access the supplemental information instance 1400 for the corresponding content item to determine start locations and end locations of each portion of text to be visually distinguished (or hidden) in accordance with the user's selection. Thus, the supplemental information instance 1400 provided with each respective content item 106 may be referred to by the presentation module 1116 to visually distinguish text associated with one or more categories, attributes, or terms of the content item selected by the user. Furthermore, while the examples herein show the supplemental information module 1140 being located on the content provider computing device(s) 1106, in other examples, some or all of the supplemental information module 1140 may be located on the electronic device 100, and thus, the electronic device 100 may generate some or all of the supplemental information 1142. Other variations will also be apparent to those of skill in the art in light of the disclosure herein.

Example Electronic Device

Figure 15:
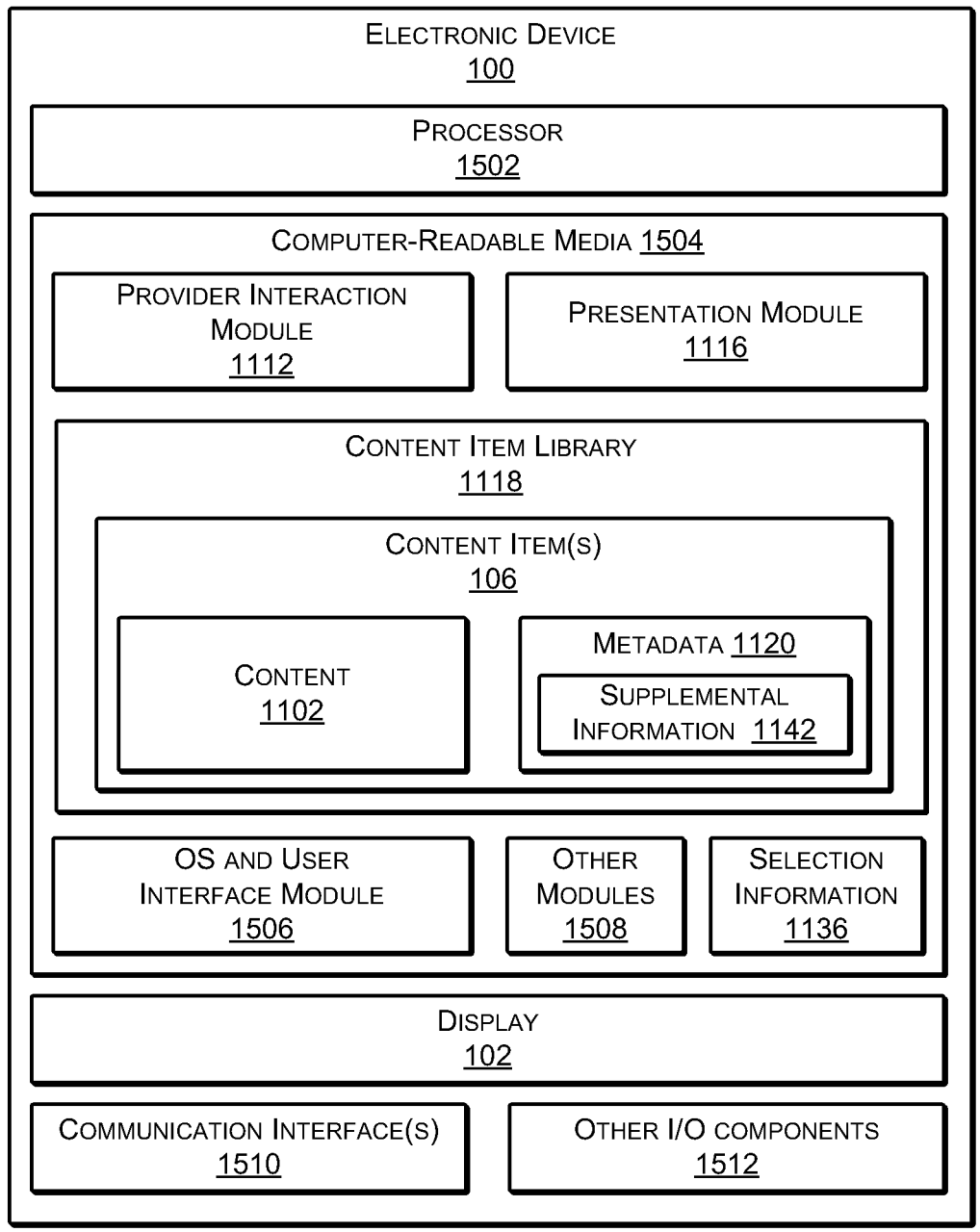
FIG. 15 illustrates select components of an example electronic device according to some implementations.

FIG. 15 illustrates select example components of the electronic device 100 that may be used to implement the functionality described above according to some implementations. In a very basic configuration, the electronic device 100 includes, or accesses, components such as at least one control logic circuit, central processing unit, or processor 1502 and one or more computer-readable media 1504. Each processor 1502 may itself comprise one or more processors or processing cores. Depending on the configuration of the electronic device 100, the computer-readable media 1504 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1502 directly or through another computing device. Accordingly, the computer-readable media 1504 may be computer-readable media able to store and maintain instructions, modules or components executable by the processor 1502.

The computer-readable media 1504 may be used to store any number of functional components that are executable by the processor 1502. In some implementations, these functional components comprise instructions or programs that are executable by the processor 1502 and that, when executed, implement operational logic for performing the actions attributed above to the electronic device 100. Functional components of the electronic device 100 stored in the computer-readable media 1504 may include the presentation module 1116, as described above, which may be executed by the processor 1502 for presenting one or more content items 106 contained in the content item library 1118. Additional functional components stored in the computer-readable media 1504 may include the provider interaction module 1112, executable by the processor 1502 for obtaining the content item(s) 106, including content 1102 as well as any corresponding metadata 1120 including supplemental information 1142. Other functional components may include an operating system and user interface module 1506 for controlling and managing various functions of the electronic device 100. Depending on the type of the electronic device 100, the computer-readable media 1504 may also optionally include other functional components, such as other modules 1508, which may include applications, programs, drivers and so forth.

The computer-readable media 1504 may also store data, data structures, and the like that are used by the functional components. For example, data stored by the computer-readable media 1504 may include the content item library 1118, containing one or more content items 106. Each content item 106 may include content 1102 and metadata 1120, which may be contained in a single file or in multiple files, and which may include supplemental information 1142. The electronic device 100 may also include other data, which may include, for example, data used by the provider interaction module 1112, the operating system and user interface module 1506, and the other modules 1508. The computer-readable media may further maintain selection information 1136, which may include information as to categories and terms selected by the user for each content item, graphics schemes selected, categories and terms to be persisted across content items, and so forth. Further, the electronic device 100 may include many other logical, programmatic and physical components, of which those described are merely examples that are related to the discussion herein.

FIG. 15 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the content items and user interface components herein may be rendered in 3D.

One or more communication interfaces 1510 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 1510 may allow a user of the electronic device 100 to access the World Wide Web, download content items from the content provider site 1110, access online content, such as from a website or other network location, and the like. The communication interface 1510 may further allow a user to access storage on another device, such as a user's computing device, a network attached storage device, cloud storage, or the like.

The electronic device 100 may further be equipped with various other input/output (I/O) components 1512. Such I/O components may include a touchscreen and various user controls (e.g., buttons, a joystick, a keyboard, a mouse, etc.), speakers, a microphone, a camera, connection ports, and so forth. For example, the operating system 1506 of the electronic device 100 may include suitable drivers configured to accept input from a keypad, keyboard, or other user controls and devices included as the I/O components 1512. For instance, the user controls may include page turning buttons, navigational keys, a power on/off button, selection keys, and so on. Additionally, the electronic device 100 may include various other components that are not shown, examples of which include removable storage, a power source, such as a battery and power control unit, a global positioning system (GPS) device, a PC Card component, and so forth.

Example Computing Device(s)

Figure 16:
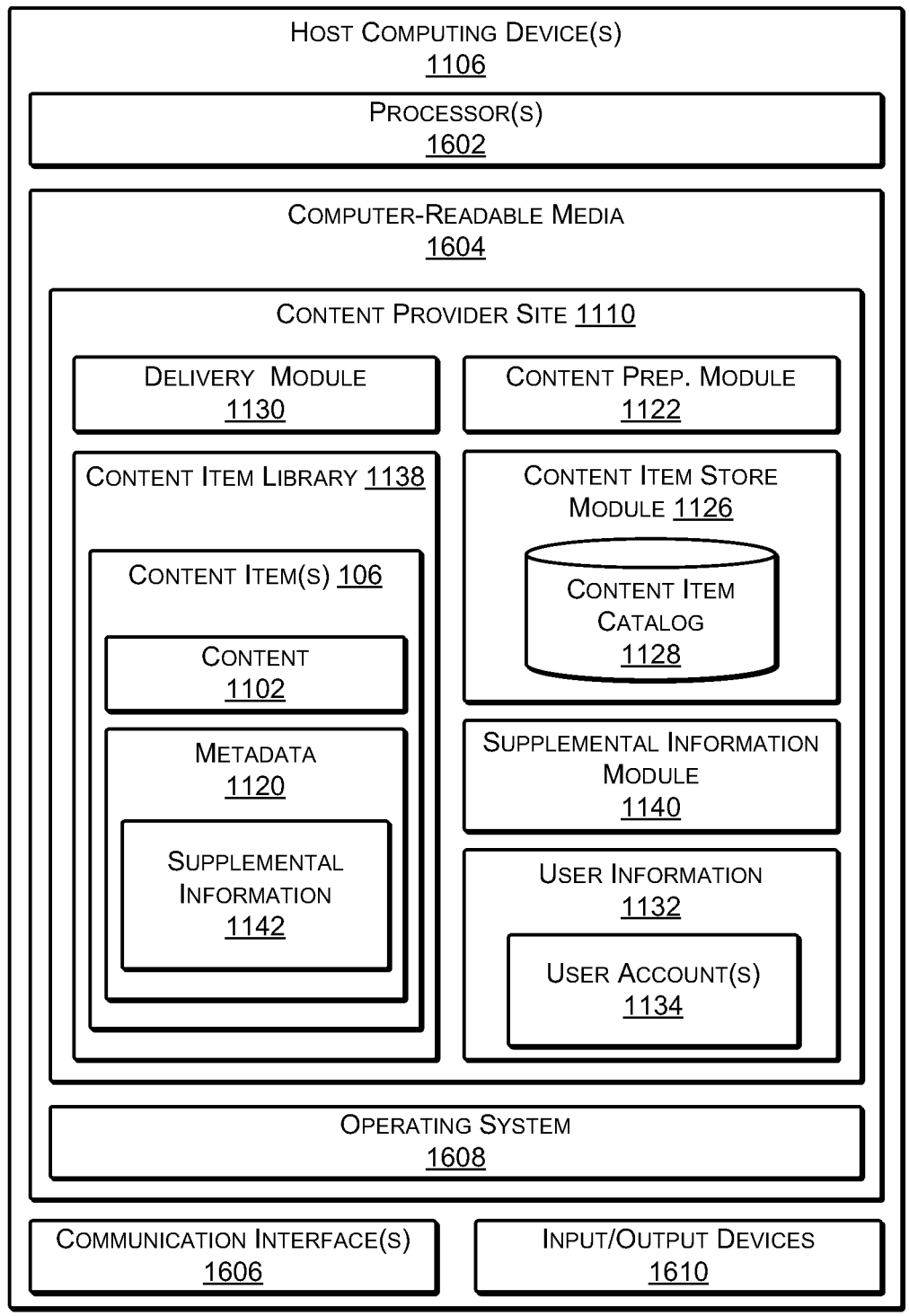
FIG. 16 illustrates select components of one or more example host computing devices of a content provider according to some implementations.

FIG. 16 illustrates select components of one or more host computing devices 1106 that may be used to implement the functionality of the content provider site 1110 according to some implementations. The content provider site 1110 may be hosted on one or more servers or other types of computing devices that may be embodied in any number of ways. For instance, in the case of a server, the content provider site 1110 may be implemented on a single server, a cluster of servers, a server farm or data center, a cloud hosted computing service, and so forth, although other computer architectures (e.g., a mainframe architecture) may also be used. Further, while the figures illustrate the components of the content provider site 1110 as being present in a single location, it is to be appreciated that these components may be distributed across different computing devices and locations in any manner. Generally, the content provider site 1110 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 16, an example host computing device 1106 includes one or more processors 1602, one or more computer-readable media 1604, and one or more communication interfaces 1606. The processor(s) 1602 may be a single processing unit or a number of processing units, and may include single or multiple computing units or multiple processing cores. The processor(s) 1602 can be configured to fetch and execute computer-readable instructions stored in the computer-readable media 1604 or other computer-readable media.

The computer-readable media 1604 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 1106, the computer-readable media 1604 may be a type of computer-readable storage media and may be a tangible non-transitory storage media.

The computer-readable media 1604 may be used to store any number of functional components that are executable by the processors 1602. In many implementations, these functional components comprise instructions or programs that are executable by the processors 1602 and that, when executed, implement operational logic for performing the actions attributed above to the content provider site 1110 and content provider 1104. Functional components of the content provider site 1110 that may be executed on the processors 1602 for implementing the various functions and features related to providing content items and visually distinguished content as described herein, include the content preparation module 1122, the content item store module 1126, the delivery module 1130, and the supplemental information module 1140. Additional functional components stored in the computer-readable media 1604 may include an operating system 1608 for controlling and managing various functions of the host computing device(s) 1106.

In addition, the computer-readable media 1604 may include, or the host computing device(s) 1106 may access, data that may include the content item library 1138, including one or more content items 106. The data may further include the user information 1132, including information for one or more user accounts 1134. In addition, the computer-readable media 1604 may store or the host computing devices(s) 1106 may access the content item catalog 1128 used by the content item store module 1126. The host computing device(s) 1106 may also include many other logical, programmatic and physical components, of which those described above are merely examples that are related to the discussion herein.

The communication interface(s) 1606 may include one or more interfaces and hardware components for enabling communication with various other devices, such as the electronic devices 100, over the network(s) 1108. For example, communication interface(s) 1606 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 1108 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 1106 may further be equipped with various input/output devices 1610. Such I/O devices 1610 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

Figure 17:
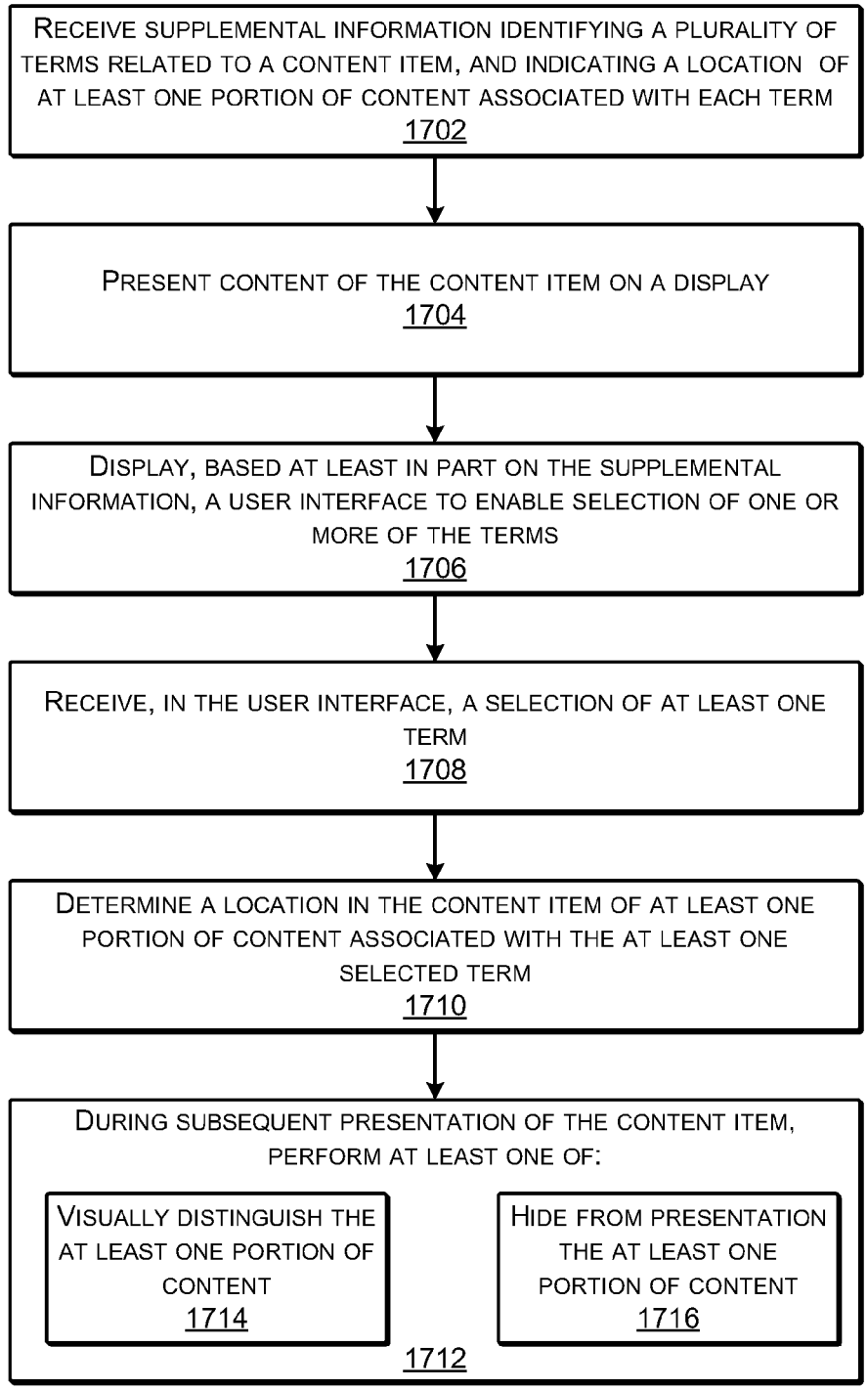
FIG. 17 is a flow diagram illustrating an example process that may be executed by an electronic device for visually distinguishing content of a content item according to some implementations.
Figure 18:
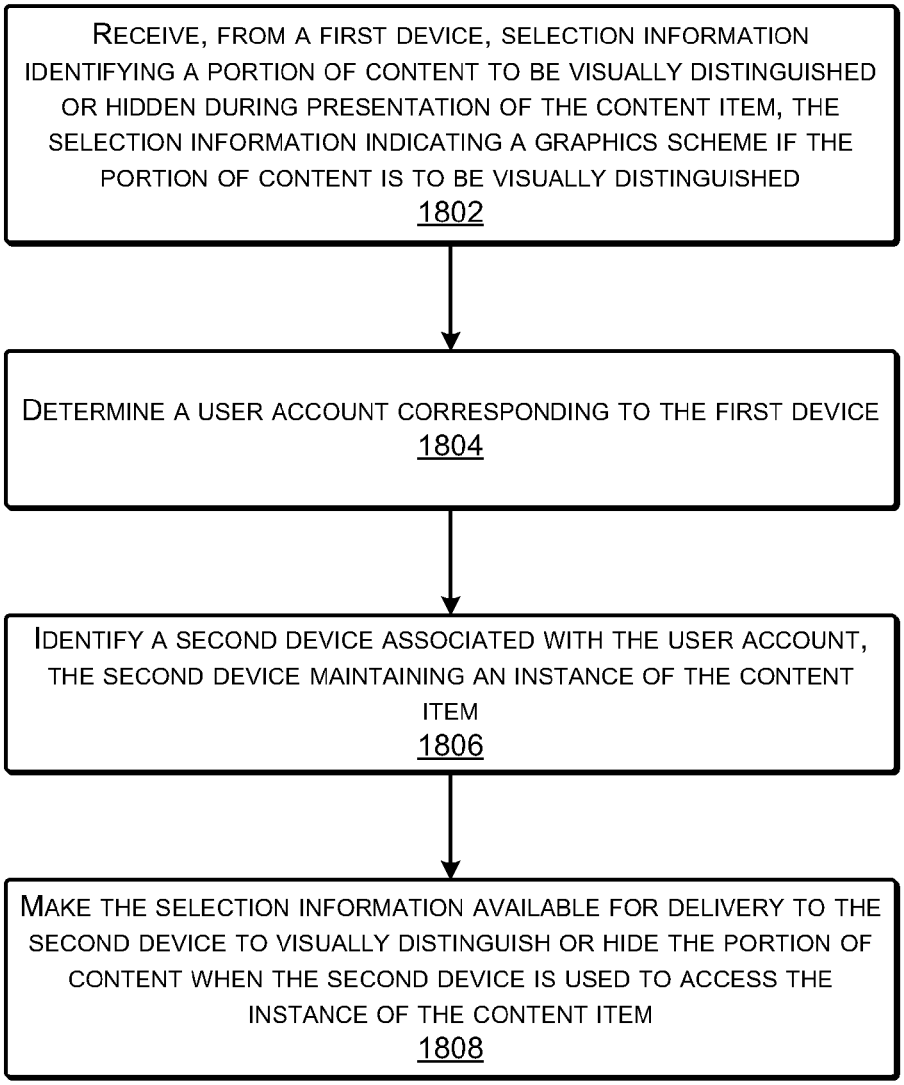
FIG. 18 is a flow diagram illustrating an example process that may be executed by a computing device of a content provider in connection with visually distinguishing a portion of content of a content item according to some implementations herein.

FIGS. 17-18 illustrate example processes for visually distinguishing and/or hiding a portion of content in connection with a content item according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 17 is a flow diagram illustrating an example process 1700 that may be executed by an electronic device 100 for visually distinguishing or hiding content of a content item according to some implementations.

At 1702, the electronic device receives supplemental information identifying a plurality of terms related to a content item, and indicating a location of at least one portion of content associated with each term. For example, the supplemental information may include a plurality of terms extracted from the content item related to a plurality of different types of categories of the content item, such as characters, places, organizations, topics, etc., as enumerated above. The supplemental information may further include location information identifying at least one portion of text or other content associated with each of the terms.

At 1704, electronic device may present content of the content item on a display of the electronic device. In some examples, the user may first open or access the content item prior to selecting one or more of the terms to be visually distinguished. In other examples, however, the user may first open a user interface for selecting one or more terms, without opening or viewing the content item.

At 1706, the electronic device displays, based at least in part on the supplemental information, a user interface to enable selection of one or more of the terms. For example, the user interface may display a list of terms available to be selected by a user. In some cases, the terms may be listed or categorized according to various different categories of the content item, as discussed above.

At 1708, the electronic device receives, in the user interface, a selection of at least one term. For example, the user may employ the user interface to select one or more of the terms related to the content item.

At 1710, the electronic device determines a location in the content item of at least one portion of content associated with the at least one selected term. For example, the electronic device may refer to the supplemental information to identify a location of a portion of the content that is associated with a selected term.

At 1712, during subsequent presentation of the content item the electronic device performs at least one of visually distinguishing the at least one portion of content, as indicated at 1714, or hiding from presentation the at least one portion of content, as indicated at 1716. For example, the user may select a graphics scheme to be used for visually distinguishing text or other content associated with a selected term. Alternatively, the user may elect to hide from presentation text or other content associated with a selected term.

FIG. 18 is a flow diagram illustrating an example process 1800 that may be executed by a computing device of a content provider in connection with visually distinguishing a portion of content of a content item according to some implementations.

At 1802, the computing device receives from a first electronic device, selection information identifying a portion of content to be visually distinguished or hidden during presentation of the content item. For example, the selection information may indicate a graphics scheme if the portion of content is to be visually distinguished.

At 1804, the computing device determines a user account corresponding to the first electronic device. For example, the computing device may identify the user account from an identifier included with the selection information received from the first device, or by other suitable techniques.

At 1806, the computing device identifies a second device associated with the user account that maintains an instance of the content item. For example, once the user account has been identified, the computing device may identify from the user account any other authorized user devices that maintain an instance of the content item.

At 1808, the computing device makes the selection information available for delivery to the second device to visually distinguished or hide the portion of content when the second device is used to access the instance of the content item. For example, the computing device may synchronize the selection information to the second device so that when the content item is accessed on the second device, the selected portion of content may be visually distinguished or hidden in the instance of the content item accessed on the second device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by one or more processors to perform operations comprising:
    receiving supplemental information associated with a content item, the supplemental information identifying a plurality of terms related to the content item, each term corresponding to at least one term category of a plurality of different term categories, the supplemental information identifying, for each term, a location in the content item of at least one respective portion of content associated with each term;
    presenting content of the content item on a display of an electronic device;
    displaying, based at least in part on the supplemental information, a user interface to enable selection of one or more of the terms related to the content item;
    receiving, via the user interface, a selection of one of the terms;
    determining, based at least in part on the supplemental information, a location in the content item of a part of the content associated with the selected term, wherein the part of the content includes additional content in addition to the selected term; and
    during subsequent presentation of the content item, performing at least one of:
        visually distinguishing the part of the content associated with the selected term; or
        hiding from presentation the part of the content associated with the selected term.

2. The one or more non-transitory computer-readable media as recited in claim 1, wherein the user interface provides an indication of the selected term and a graphics scheme to be applied to the part of the content corresponding to the selected term.

3. The one or more non-transitory computer-readable media as recited in claim 1, wherein:
    at least one term category of the plurality of term categories includes place names mentioned in the content item; and
    the selected term corresponds to a place name of the place names.

4. The one or more non-transitory computer-readable media as recited in claim 1, wherein:
    at least one term category of the plurality of term categories includes topic names mentioned in the content item; and
    the selected term corresponds to a topic name of the topic names.

5. The one or more non-transitory computer-readable media as recited in claim 1, the user interface further including a control that is able to be selected for at least one of:
    visually distinguishing words in a language different from a primary language of the content item;
    visually distinguishing slang; or
    visually distinguishing colloquialisms.

6. A method comprising:
    under control of one or more processors configured with executable instructions,
    displaying a user interface to enable selection of one or more terms of a plurality of terms, each term corresponding to at least one term category of a plurality of different term categories;
    receiving selection of an attribute category, the selection of the attribute category causing selection of at least one term, wherein the selected term is associated with the selected attribute category; and
    during presentation of at least one of the content item or a part of the content item, performing at least one of:
        visually distinguishing a portion of content corresponding to the selected term; or
        hiding from presentation the portion of content corresponding to the selected term.

7. The method as recited in claim 6, wherein receiving the selection further comprises:
    receiving a selection of a first term corresponding to a first term category; and
    receiving a selection of a second term corresponding to a second term category, wherein the second term category is different from the first term category.

8. The method as recited in claim 7, wherein the visually distinguishing further comprises visually distinguishing a first portion of content associated with the first term using a first graphics scheme that is different from a second graphics scheme used to visually distinguish a second portion of content associated with the second term.

9. The method as recited in claim 6, wherein the plurality of term categories include at least one of:

a character mentioned in the content item;
a person mentioned in the content item;
a place mentioned in the content item;
a thing mentioned in the content item;
an interaction between characters in the content item;
an organization or group mentioned in the content item;
a relationship between characters in the content item;
a theme in the content item;
a scene in the content item;
an event mentioned in the content item;
a phrase used in the content item;
a topic mentioned in the content item;
a citation provided in the content item; or
a time period associated with the content item.

10. The method as recited in claim 6, wherein the portion of content includes at least one of text or an image.

11. The method as recited in claim 6, further comprising receiving a selection of a graphics scheme to be used for visually distinguishing the portion of content corresponding to the selected term.

12. The method as recited in claim 6, wherein visually distinguishing the portion of content comprises applying to the portion of content, or to another portion of content, at least one of:
color;
bolding;
italicizing;
underlining;
outlining;
strikethrough;
highlighting;
background pattern;
fading or graying-out;
text font;
text style or size; or
one or more graphical elements.

13. The method as recited in claim 6, wherein receiving selection of the attribute category further comprises receiving a selection of a topic, the selection of the topic resulting in display in the user interface of one or more subtopics of the selected topic, the one or more subtopics able to be selected as additional terms.

14. The method as recited in claim 6, further comprising displaying the user interface overlaid on a presentation of content of the content item.

15. The method as recited in claim 6, further comprising sending, over a network, selection information indicating the portion of content to be visually distinguished or hidden during presentation of the content item.

16. The method as recited in claim 15, wherein sending the selection information includes sending at least location information indicating a location in the content item of the portion of the content corresponding to the selected term, and information indicating a graphics scheme to be applied to the portion of content.

17. The method as recited in claim 6, further comprising receiving a selection to rearrange a display format of the content item to a script view in which a representative name of a character is displayed adjacent to dialogue associated with the character in place of an alternate name for the character originally associated with the dialogue.

18. The method as recited in claim 6, wherein the content item is a first content item, the method further comprising:
presenting content of a second content item; and
based at least in part on the selection of the selected term corresponding to the term category of the first content item, performing at least one of:
visually distinguishing a portion of content of the second content item corresponding to the at least one term; or
hiding from presentation the portion of content of the second content item corresponding to the at least one term.

19. A device comprising:
a display;
one or more processors;
one or more computer-readable media; and
one or more modules maintained on the one or more computer-readable media and executed by the one or more processors to perform acts comprising:
receiving, via a user interface, a selection of a term related to a content item; and
when presenting content of the content item on the display, hiding from presentation at least one portion of the content associated with the selected term based at least in part on location information associated with the selected term.

20. The device as recited in claim 19, wherein:
the selected term is a character name or person name; and
the at least one portion of the content hidden from presentation includes dialogue associated with the character name or person name.

21. The device as recited in claim 19, wherein:
the selected term is a place name of a place mentioned in the content item; and
the at least one portion of the content hidden from presentation includes content associated with the place name in addition to the place name.

22. The device as recited in claim 19, wherein:
the selected term is a topic name of a topic mentioned in the content item; and
the at least one portion of content hidden from presentation includes content associated with the topic in addition to the topic name.

23. The device as recited in claim 19, the acts further comprising:
receiving a selection of a different term related to the content item; and
visually distinguishing content associated with the different term from other content of the content item when presented on the display.

24. A device comprising:
a display;
one or more processors;
one or more computer-readable media; and
one or more modules maintained on the one or more computer-readable media to be executed by the one or more processors to perform operations including:
displaying, on the display, content of a content item; and
visually distinguishing, from other content of the content item, based at least in part on a selection of a place name of a place mentioned in the content item, at least one portion of content associated with the place name, wherein at least some of the at least one portion of content does not include the place name.

25. The device as recited in claim 24, the operations further comprising visually distinguishing, from the at least one portion of content and from the other content, at least one other portion of content associated with another place name.

26. The device as recited in claim 24, wherein:
multiple portions of content associated with the place name are visually distinguished from the other content of the content item; and at least one of the multiple portions of content associated with the place name includes an alternate name for the place name.

27. The device as recited in claim 24, displaying content of the content item further comprises visually distinguishing a content portion related to a different place name that corresponds to a geographic location that is located within a geographic region corresponding to the selected place name.

28. The device as recited in claim 24, further comprising displaying a user interface to enable selection of the place name from among a plurality of place names displayed in the user interface.

29. A method comprising:
under control of one or more processors configured with executable instructions,
receiving a selection of a plurality of topic names mentioned in a content item;
displaying content of the content item with at least one first portion of content associated with a first topic name visually distinguished from at least one second portion of content associated with a second topic name; and
visually distinguishing a portion of content associated with at least one of the topic names when displaying content of a second content item.

30. The method as recited in claim 29, further comprising displaying a user interface to enable selection of the plurality of topic names from among multiple topic names displayed in the user interface.

31. The method as recited in claim 30, wherein selection of one of the topic names results in display in the user interface of one or more subtopics of the selected topic name.

32. The method as recited in claim 29, wherein displaying content of the content item further comprises displaying the content with the first portion and the second portion being visually distinguished from a least one other portion of the content.

33. A system comprising:
one or more processors;
one or more computer readable media maintaining one or more modules executable by the one or more processors to perform operations comprising:
receiving, over a network, from a first device, selection information identifying a portion of content to be visually distinguished or hidden during presentation of a content item, the selection information indicating a graphics scheme if the portion of content is to be visually distinguished;
determining a user account corresponding to the first device;
identifying a second device associated with the user account, the second device maintaining an instance of the content item; and
making the selection information available for delivery over the network to the second device.

34. The system as recited in claim 33, the operations further comprising aggregating the selection information with selection information received from one or more other devices to determine one or more portions of content of the content item that have been selected to be visually distinguished or hidden by a plurality of users more frequently than one or more other portions of content of the content item.

35. The system as recited in claim 34, the operations further comprising making available for delivery to at least one of the first device, the second device, or the one or more other devices, information indicating the one or more portions of content of the content item that have selected to be visually distinguished or hidden by the plurality of users more frequently than one or more other portions of content of the content item.

* * * * *